US008738898B2

(12) United States Patent
Herwono et al.

(10) Patent No.: US 8,738,898 B2
(45) Date of Patent: May 27, 2014

(54) PROVISION OF SECURE COMMUNICATIONS CONNECTION USING THIRD PARTY AUTHENTICATION

(75) Inventors: Ian Herwono, Stowmarket (GB); Paul W Hodgson, Woodbridge (GB)

(73) Assignee: British Telecommunications plc, London (GB)

(*) Notice: Subject to any disclaimer, the term of this patent is extended or adjusted under 35 U.S.C. 154(b) by 839 days.

(21) Appl. No.: 12/302,568

(22) PCT Filed: May 31, 2007

(86) PCT No.: PCT/GB2007/002010
§ 371 (c)(1),
(2), (4) Date: Nov. 26, 2008

(87) PCT Pub. No.: WO2007/141486
PCT Pub. Date: Dec. 13, 2007

(65) Prior Publication Data
US 2009/0287922 A1 Nov. 19, 2009

(30) Foreign Application Priority Data
Jun. 8, 2006 (EP) .................................. 06252961

(51) Int. Cl.
*H04L 29/00* (2006.01)
(52) U.S. Cl.
USPC ........... 713/155; 380/247; 380/248; 380/249; 380/250
(58) Field of Classification Search
USPC .................................. 713/155; 380/247–250
See application file for complete search history.

(56) References Cited

U.S. PATENT DOCUMENTS 5,091,942 A 2/1992 Dent
7,143,436 B2 * 11/2006 Yamaguchi et al. ............. 726/6
(Continued)

FOREIGN PATENT DOCUMENTS

EP 0 810 754 12/1997
EP 1 458 151 A 9/2004
(Continued)

OTHER PUBLICATIONS

International Search Report for PCT/GB2007/002010, mailed Sep. 17, 2007.

(Continued)

*Primary Examiner* — Jeffrey Pwu
*Assistant Examiner* — Helai Salehi
(74) *Attorney, Agent, or Firm* — Nixon & Vanderhye PC

(57) ABSTRACT

The present invention relates to communications, and in particular though not exclusively to forming a secure connection between two untrusted devices. The present invention provides a method of securely connecting a first device (A) to a second device (B) using a third party authentication server (AS) coupled to the second device, the first device and the authentication server both having first device shared secret data (SSDa) and the second device and the authentication server both having second device shared secret data (SSDb). The method comprises receiving a request from the first device at the authentication server; the authentication server and the first device both generating a first device key (K_A) using the first device shared secret data in response to a first device random number (RANDa) sent from the authentication server to the first device; the authentication server and the second device both generating a second device key (K_B) using the second device shared secret data in response to a second device random number (RANDb) sent from the authentication server to the second device; and the authentication server securely forwarding to the second device (B) and the first device (A) a common key (K_AB) using the second and first device keys (K_B, K_A).

17 Claims, 14 Drawing Sheets

(56) References Cited

U.S. PATENT DOCUMENTS

| | | | |
|---|---|---|---|
| 7,418,511 B2* | 8/2008 | Takechi et al. | 709/229 |
| 7,681,033 B2* | 3/2010 | Miura et al. | 713/155 |
| 7,688,785 B2 | 3/2010 | Bachmann et al. | |
| 7,716,483 B2* | 5/2010 | Sozzani et al. | 713/171 |
| 7,724,904 B2 | 5/2010 | Lee et al. | |
| 7,813,511 B2 | 10/2010 | Leung et al. | |
| 2002/0147926 A1 | 10/2002 | Pecen et al. | |
| 2003/0026433 A1 | 2/2003 | Matt | |
| 2003/0191939 A1 | 10/2003 | Tsai et al. | |
| 2004/0179502 A1 | 9/2004 | Naghian et al. | |
| 2004/0179682 A1 | 9/2004 | Soliman | |
| 2004/0229597 A1 | 11/2004 | Patel | |
| 2005/0120214 A1 | 6/2005 | Yeates et al. | |
| 2005/0141706 A1 | 6/2005 | Regli et al. | |
| 2005/0152305 A1 | 7/2005 | Ji et al. | |
| 2005/0177723 A1 | 8/2005 | Huang et al. | |
| 2006/0052085 A1 | 3/2006 | Rodriguez et al. | |
| 2006/0067281 A1 | 3/2006 | Kwak et al. | |
| 2006/0087999 A1 | 4/2006 | Gustave et al. | |
| 2006/0094401 A1 | 5/2006 | Eastlake | |
| 2007/0192602 A1 | 8/2007 | Blom et al. | |
| 2008/0192695 A1 | 8/2008 | Krishnan et al. | |

FOREIGN PATENT DOCUMENTS

| | | |
|---|---|---|
| EP | 1 624 639 A1 | 2/2006 |
| EP | 1 650 915 A | 4/2006 |
| FR | 2 851 830 | 9/2004 |
| WO | 2007/107708 A2 | 9/2007 |

OTHER PUBLICATIONS

European Telecommunications Standards Institute, GSM 03.20, V 7.2.0, pp. 1-105 (Nov. 1999).
Borisov, et al., "Intercepting Mobile Communications: The Insecurity of 802.11," Proceedings of the $7^{th}$ Annual International Conference on Mobile Computing and Networking, 2001, pp. 180-189.
IEEE 802.11i Standard—802.11i-2004—IEEE Standard for information technology-Telecommunications and information exchange between systems—Local and metropolitan area networks—Specific requirements—Part 11: Wireless LAN Medium Access Control (MAC) and Physical Layer (PHY) specifications: Amendment 6: Medium Access Control (MAC) Security Enhancements, http://standards.ieee.org/findstds/standard/802.11i-2004.
Sankar, et al., "Cisco Wireless LAN Security," ISBN: 1587051540, Cisco Press, Nov. 2004, Chapter 7, 36 pgs.
Internet Engineering Task Force, Request for Comments 2284, "PPP Extensible Authentication Protocol (EAP)," Mar. 1998, http://datatracker.ietf.org/doc/rfc2284/, 2 pgs.
IEEE Std 802.1X—2004, IEEE Standard for Local and Metropolitan Area Networks, Port-Based Network Access Control, Dec. 13, 2004, 179 pgs.
Internet Engineering Task Force, Request for Comments 3748, "Extensible Authentication Protocol (EAP)," Jun. 2004, http://tools.ietf.org/html/rfc3748, 68 pgs.
Otway, et al., "Efficient and Timely Mutual Authentication," Operating Systems Review, 21(1):8-10, 1987, 3 pgs.
Chandra, et al., "MultiNet: Connecting to Multiple IEEE 802.11 Networks Using a Single Wireless Card," IEEE Infocom, Hong Kong, Mar. 2004, 12 pgs.
Internet Engineering Task Force, Request for Comments 4120, "The Kerberos Network Authentication Service (V5)," Jul. 2005, http://datatracker.ietf.org/doc/rfc4120/.
Menezes, et al., "Handbook of Applied Cryptography," CRC Press Series on Discrete Mathematics and its Applications, Boca Raton, FL, USA, 1997, pp. 1, 489-508, 549-550.
Ala-Laurila, et al., "Wireless LAN Access Network Architecture for Mobile Operators," IEEE Communications Magazine, vol. 39, No. 11, Nov. 2001, pp. 82-89.
Danzeisen, et al., "Heterogeneous network establishment assisted by cellular operators," $5^{th}$ IFIP TC6 International Conference on Mobile and Wireless Communication Networks, Oct. 27, 2003, 6 pgs.
Danzeisen, et al., "Implementation of a Cellular Framework for Spontaneous Network Establishment," 2005 IEEE Wireless Communications and Networking Conference, vol. 3, pp. 1683-1689, 7 pgs.
Aboba, et al., "IEEE 802.1X for Wireless LANs," Presentation given at IEEE Plenary meeting, Albuquerque, New Mexico, USA, Mar. 2000, 27 pgs.
Walker, "RE: EAP key naming," Submission to EAP Mailing List, Jul. 10, 2003, 4 pgs.
Geier, "802.1X Offers Authentication and Key Management," Tutorial on www.wi-fiplanet.com dated May 7, 2002, 3 pgs.
Ayyagari, et al., "Making IEEE 802.11 Networks Enterprise-Ready," Microsoft Windows Server 2000 White Paper, May 2001, 36 pgs.
Zhu, et al., "Establishing Pairwise Keys for Secure Communication in Ad Hoc Networks: A Probabilistic Approach," Network Protocols, 2003, Proceedings $11^{th}$ IEEE International Conference, pp. 326-335, Nov. 4-7, 2003.
Lee, "A User Authentication Protocol Using EAP for Mobile Ad Hoc Networks," in Proceedings of the IASTED International Conference Communication, Network and Information Security, Dec. 2003, New York, USA 5 pgs.
Pirzada, et al., "Kerberos Assisted Authentication in Mobile Ad-hoc Networks", in Proceedings of the $27^{th}$ Australasian Conference on Computer Science—vol. 26 (ACSC '04), Estivill-Castro (ed.), Australian Computer Society, Inc., Darlinghurst, Australia, pp. 41-46, 2004, 6 pgs.
ETSI-GSM Technical Specification (GSM 03.20, Version 3.3.2, UDS 621.396.21): European digital cellular telecommunication system (phase 1): Security-related Network Functions, pp. 1-44 (1992).
ETSI-TS 133 102 V5.5.0 (Sep. 2004) Technical Specification, Universal Mobile Telecommunications System (UMTS), 3G Security, Security Architecture (3GPP TS 33.102, Version 5.5.0, Release 5).
"EAP Authentication Protocols for WLANS," Access Control and Authentication Mechanisms, Chapter 7, 36 pages, 2004.
Schneier, Applied Cryptography, Second Edition, Protocols, Algorithms and Source Code in C, Chapter 3, Basic Protocols, John Wiley & Sons, Inc. (ed.), pp. 56-65 (1996).
ETSI TS 133 102 V 6.5.0 (Dec. 2005), Technical Specification, Universal Mobile Telecommunications System (UMTS), 3G Security, Security Architecture (3GPP TS 33.102, Version 6.5.0, Release 6), pp. 1-63.
Final Office Action mailed Mar. 13, 2012, in U.S. Appl. No. 12/293,449.
Amendment filed Nov. 25, 2011, in U.S. Appl. No. 12/293,449.
Office Action mailed May 25, 2011, in U.S. Appl. No. 12/293,449.
Preliminary Amendment filed Sep. 18, 2008, in U.S. Appl. No. 12/293,449.
Request for Comments: 4186, "Extensible Authentication Protocol Method for Global System for Mobile Communications (GSM), Subscriber Identity Modules (EAP-SIM)," pp. 1-86, Haverinen, et al., ed., Jan. 2006, copy available from: http://www.ietf.org.rfc/rfc4186.txt.
RADIUS Protocol Security and Best Practices, pp. 1-13, Jan. 17, 2002, copy available from: http://technet.microsoft.com/en-us/library/bb742489.aspx.
Bluetooth® SIM Access Profile, User Interface Scenarios and Security Recommendations, White Paper Revision, pp. 1-14, May 16, 2005.

\* cited by examiner

US 8,738,898 B2

PROVISION OF SECURE COMMUNICATIONS CONNECTION USING THIRD PARTY AUTHENTICATION

This application is the U.S. national phase of International Application No. PCT/GB2007/002010, filed 31 May 2007, which designated the U.S. and claims priority to EP 06252961.5, filed 8 Jun. 2006, the entire contents of each of which are hereby incorporated by reference.

FIELD OF THE INVENTION

The present invention relates to communications and in particular though not exclusively to forming a secure connection between two untrusted devices.

BACKGROUND OF THE INVENTION

The provision of secure communications links or connections between two parties over an insecure network is an ongoing problem, as a malevolent third party may intercept these communications and may also try to impersonate one of the communicating parties. Typically the communications such as packets are encrypted, and in order to provide strong security this may be achieved using large random keys provided either using a public key cryptography system or a shared secret key system. However encryption requires a lot of processing resources, and in addition may require technical input in order to provide high levels of security. This can be problematic for devices operated by individual consumers who may be using small electronic devices such as mobile phones with limited processing resources, and who are typically not technically proficient. In addition to the problem of providing an encrypted communications channel, there is a need for one or both parties to authenticate the other, or in other words to confirm that the other party is indeed who they say they are; and not a malevolent third party.

With cellular networks, each subscriber is provided with a subscriber identity module (SIM) card or similar removable module comprising shared secret data including a secret key shared with the network provider or operator. The secret key stored on the SIM card can be used to generate session keys which the mobile device can use to encrypt and decrypt communications with the network operator. The mobile phone and network provider can also authenticate each other by sending challenges (e.g. random numbers) which are processed using the shared secret data and compared to determine if the two processed challenges match. The use of SIM cards is therefore a good solution for a centralized network operator with many non-technical subscribers, as the subscriber is merely required to insert the SIM card into their mobile phone.

However this type of solution is not suitable for other types of networks which may have too few (e.g. Wi-Fi base station) subscribers to issue a physical SIM card to each. Small wireless networks such as a wireless local area network (WLAN) typically rely on users entering a secret shared key into each device, which key is then used in a predetermined way to generate session keys for encrypting packets, and to authenticate each device to the other. However this can be technically challenging, time-consuming and inconvenient for users of a WLAN to set-up; particularly those who may purchase a WLAN access point (e.g. WiFi router) off-the-shelf. For example in a typical WiFi WLAN, the user must enter a password into the access point, together with an identifier for any users (e.g. mobile devices such as mobile phones or laptop computers), a channel identifier (BSS), and the type of encryption and authentication to be used. Each mobile device which is to connect to the access point must also be programmed with corresponding parameters, even if the connection is temporary—for example a visiting friend using the WLAN for a short period.

SUMMARY

The present exemplary embodiment provides a third party authentication server which can be used by a first device (e.g. mobile phone or first Internet appliance) and a second device (e.g. WiFi router or second Internet appliance) to securely connect with each other over an insecure network. The authentication server comprises respective shared secret data also contained separately on the first device and the second device, and using this is able to securely set-up a secure connection between the first device and the second device. The authentication server does this by generating one or more random numbers for each of the first and second devices which are used by these respective devices together with their respective shared secret data to generate respective first and second device keys. The authentication server securely forwards a common shared key to the first device and the second device using the first and second device keys. The client and server can then communicate securely using this common shared key.

In an exemplary embodiment, the common shared key is securely forwarded by encrypting the common shared key with the first device key and sending it to the first device, and by encrypting the common shared key with the second device key and sending it to the second device. In an alternative embodiment, the common shared key is derived using one of the device keys—the first device key say, and is then encrypted using the second device key and sent to the second device, the second device uses the common shared key to generate a validation parameter which is sent to the first device. Upon validating this validation parameter, the first device then generates the common shared key using the first device key.

In an exemplary embodiment, the first and second device shared secret data are stored on respective secure modules associated with the respective devices. The secure modules are typically removable hardware modules such as Universal Integrated Circuit Cards (UICC), for example, SIM or Smart cards, which means that they are readily portable and useable with a wide range of devices which the user might not normally have control over, for example, a personal computer (PC) in an Internet café or hotel. However, the secure modules may also be hardware or software modules "semi-permanently" installed in a device or not readily removable by the user and associated with the respective devices, such as a secure chip on a laptop's motherboard, or some other Trusted Computing Module or Platform. Each secure module comprises a secret key together with a secret algorithm which is shared with the authentication server. The secret algorithm responds to a random number (from the authentication server) using the secret key to generate a response or processed random number which can be used as a device specific key or authentication challenge response, both of which can also be generated by the authentication server.

Thus the random numbers can also be used to authenticate the first device and second device to the authentication server. Similarly random numbers sent from the first and second device to the authentication server can be used to authenticate the authentication server to the first and second devices—the challenging party sending a random number to the challenged party which can then be altered or processed in a predetermined way using the shared secret data (e.g. the secret key and algorithm in the secure module) and returned, the challenging party then checking this result against the result of processing the random number in the same way using its own shared secret data.

In an exemplary embodiment, the secure modules are physically connected to the respective first and second devices, for example, as a tamper resistant secure chip or a SIM card inserted into a respective connector in the device. In an alternative embodiment, one or both of the secure modules may be physically connected to another (proxy) device which is in an independently secure connection with the respective first or second device. For example, the proxy device in one or both cases may be a mobile phone in which the SIM card is used as the secure module for the first or second device to which the proxy device (e.g. mobile phone) is securely connected, for example, by a secure Bluetooth wireless association. In this later case, the random number from the authentication server is forwarded to the associated (first or second) device for example using a secure WiFi connection, and the first or second device key and/or authentication challenge response is forwarded from the proxy device back to the respective first or second device either to retain as the first or second device key or to forward to the authentication server as the authentication challenge response.

This means that the users of the first and second devices do not need to enter a common secret key in order to provide a secure connection between the two, but can instead rely on a trusted third party to do the authentication and/or common secret key provision on their behalf.

Thus there is no need for technically unsophisticated operators of the client device and wireless server to undertake any complicated actions surrounding the manual configuration of a secure connection. Instead this can be replaced by inserting suitable SIM cards or other removable modules (or relying on a more semi-permanently connected secure module) comprising shared secret data which is shared with a trusted third party authentication server. For example, when a new client (first) device is to be added to a WLAN, the operator of the WLAN access point (second device) may simply insert a SIM card (SIM B) into the access point or use the SIM card (SIM B) from his or her mobile phone together with a connection to the access point. The client device has another SIM card inserted or otherwise associated (SIM A) and requests a secure connection with the access point using the authentication server. This process is then performed automatically without further input from either operator, so that the users are not required to enter a shared secret key.

In an exemplary embodiment, the authentication server is the network providing SIM cards which are used as the secure modules, though the authentication server may be a higher level entity which is trusted by a number of different network operators.

Exemplary embodiments provide both methods of operating a system, authentication server, and first and second devices, as well as the system, authentication server, and first and second devices themselves. There are also provided corresponding computer programs arranged to implement the methods and/or devices.

BRIEF DESCRIPTION OF THE DRAWINGS

Exemplary embodiments will now be described with reference to the following drawings, by way of example only and without intending to be limiting, in which.

DETAILED DESCRIPTION

Figure 1:
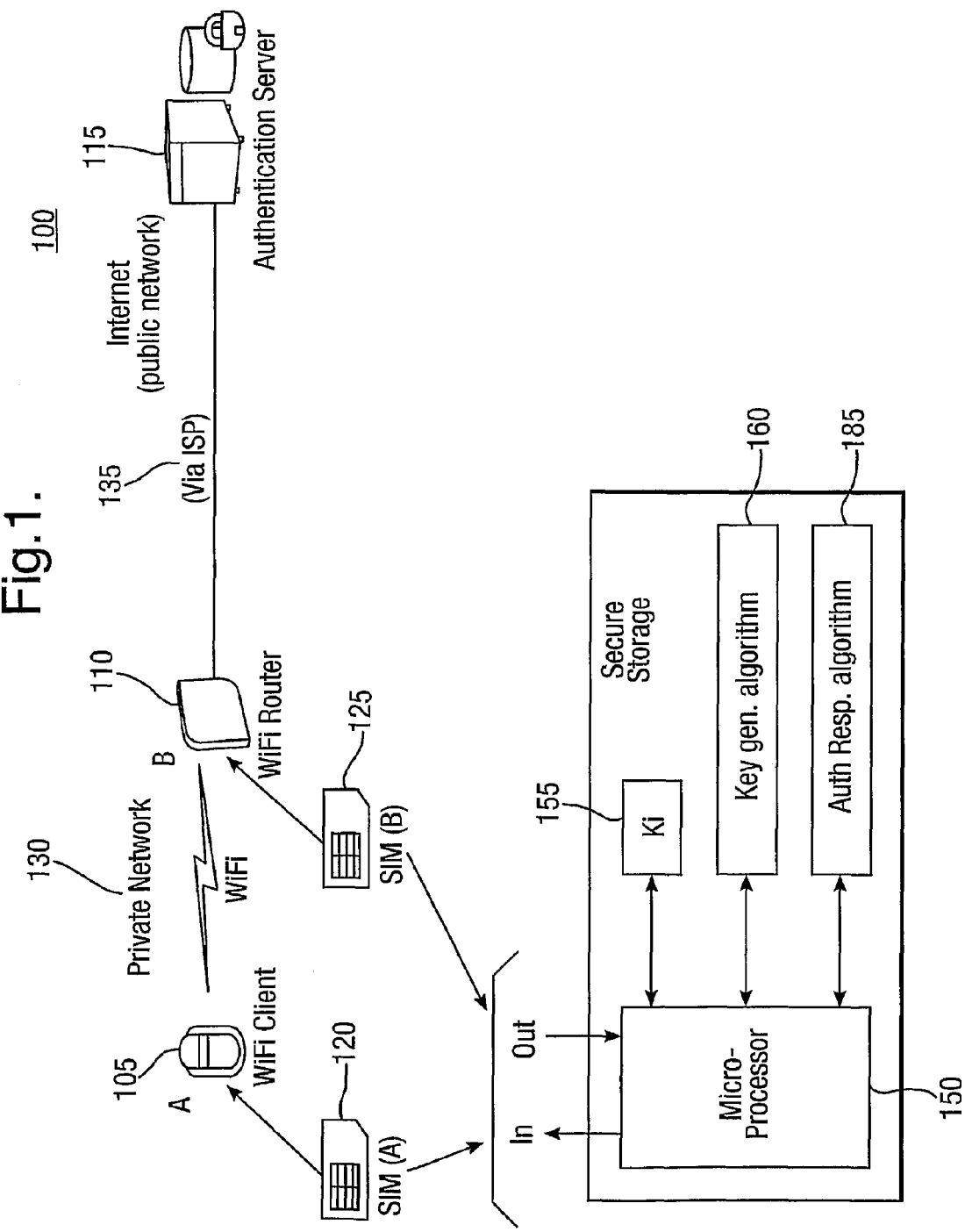
FIG. 1 is a schematic for a first embodiment of the present invention.

FIG. 1 illustrates a wireless communication system 100 according to a first embodiment and comprising a first or client device (A) such as a mobile phone 105, a second device (B) or communications server such as a WiFi router 110, and an authentication server (AS) 115. The client device 105 can communicate with the wireless server 110 using a WLAN 130 or private wireless network such as a WiFi network. The wireless server 110 communicates with the authentication server using another network 135 such as the Internet. In order to communicate securely with each other over the WiFi network 130, the client device 105 and wireless server 110 must share a secret key which they both use to encrypt and decrypt packets sent between them. Traditionally provision of these keys has been provided by users of the two devices (105, 110) manually entering a common password. In this embodiment however, two SIM cards are used, a first SIM (A) card 120 for the first device, in this embodiment a wireless client device 105, and a second SIM (B) card 125 for the second device, in this embodiment a wireless server 110. As will be appreciated by those skilled in the art, each SIM card 120, 125 contains an embedded microprocessor 150 and secret shared data (SSD) including a secret key 115 (Ki), key generating algorithms 160, and authentication response algorithms 165 which are securely embedded within the SIM card 120, 125 and not available to a device using the SIM card such as a mobile phone. Instead the device can provide the SIM card with a number which can be used by the SIM card 120, 125 together with the secret key (Ki) and one of the secret algorithms 160, 165 to output another number such as a session key or an authentication challenge response.

In order to agree a common session key and securely distribute this to the client device 105 and wireless server 110, the third party authentication server 115 is used. The authentication server 115 is known and trusted by both the client device 105 and the wireless server 110, and comprises the shared secret data of both the SIM card (A) 120 associated with the client device 105 and the SIM card (B) 125 associated with the wireless server 110—in other words it holds both secret keys (Ki) 155, both sets of session key generation algorithms 160, and both sets of authentication challenge algorithms 165. Thus although the client device 105 and wireless server 110 have no common secret data on which they could base a secure communications link, the authentication server 115 is able to communicate securely with both the client device 105 using a first device key (K_A) generated from the secret key 155 (Ki-A) on the first SIM card (A) 120 and with the wireless server 110 using a second device key (K_B) generated from the secret key (Ki-B) on the second SIM card (WS) 125. The authentication server 115 can then generate a common key (K_AB) for the client device 105 and the wireless server 110 to use, and then send this securely to each.

Figure 2:
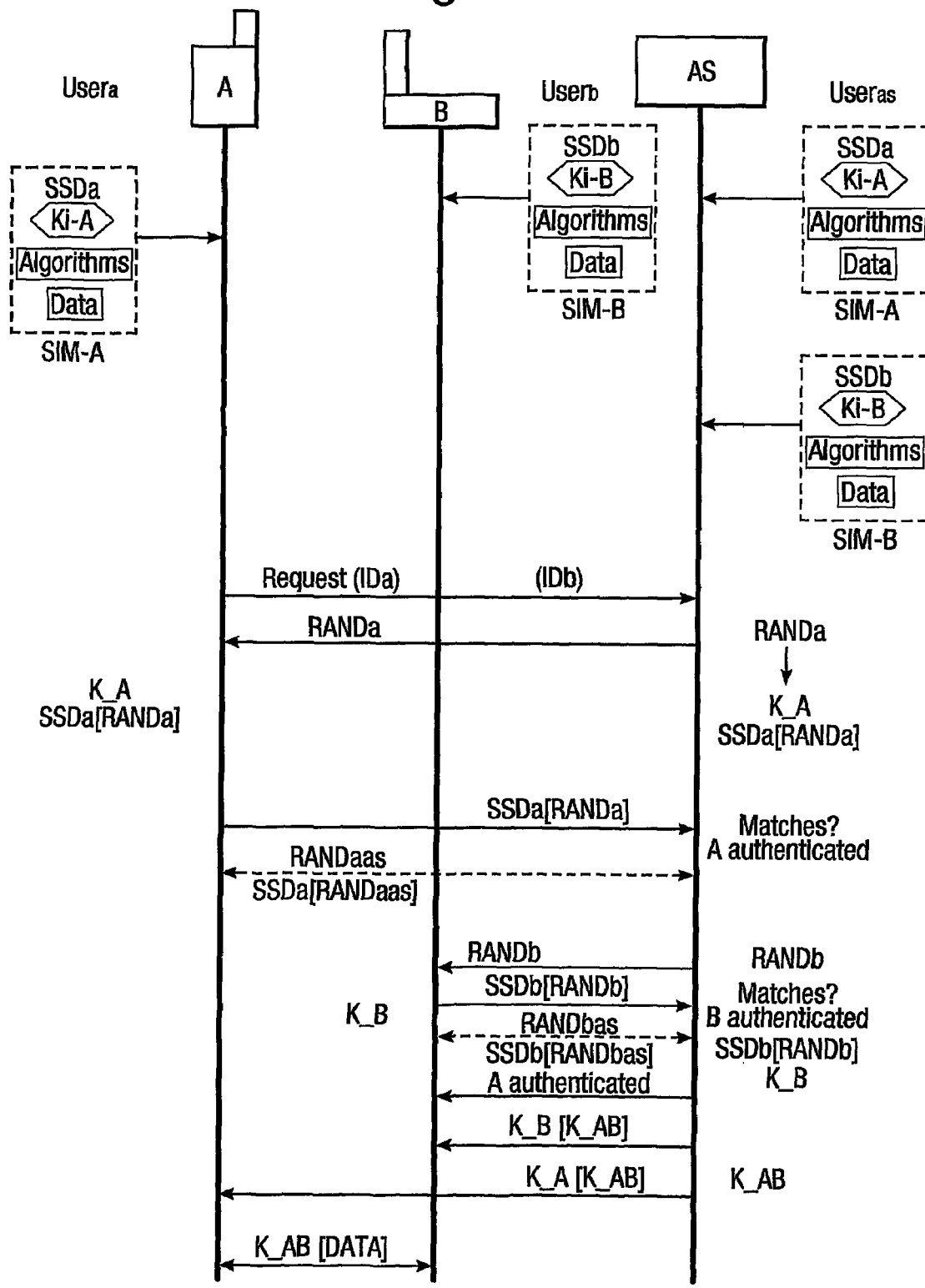
FIG. 2 illustrates a signalling diagram for a first embodiment of the present invention.
Figure 3:
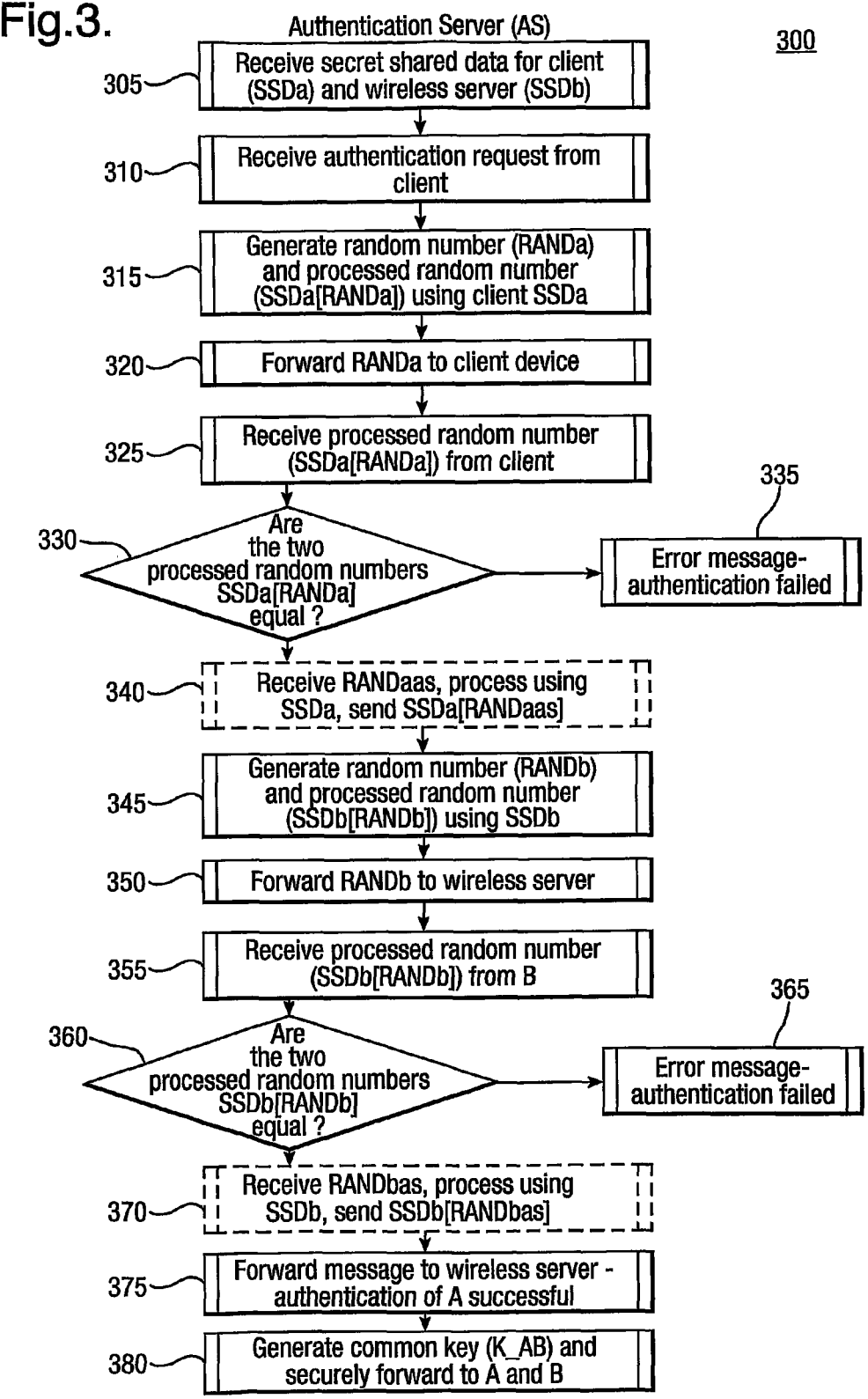
FIG. 3 illustrates a flow chart for an authentication server of the first embodiment.

This general approach is illustrated in more detail in FIGS. 2-5 which also shows authentication of the various parties. FIG. 2 shows signalling between the various parties, the client device 105 (A), the wireless server 110 (B), and the authentication server 115 (AS). Referring initially also to FIG. 3, this shows a method [300] of operation of the authentication server which receives first and second device secret shared data for both the client device (SSDa) and the wireless server (SSDb) respectively [305]. The client or first device shared secret data (SSDa) comprises a secret key (Ki-A) and various algorithms and identification data and is also stored on the SIM card 120 inserted into the client device 105. Similarly the wireless server or second device shared secret data (SSDb) comprises a different secret key (Ki-B) and various algorithms and identification data and is also stored on the SIM card 125 inserted into the wireless server 110. The authentication server then receives an authentication request from a client device [310]. This will typically include a first device identifier (IDa) associated with the client device, and a second device identifier (IDb) for the wireless server so that the authentication server may identify the relevant shared secret data (SSDa and SSDb) for each.

The authentication server then generates a first device random number (RANDa) together with a first device processed random number (SSDa[RANDa]) or challenge response using its shared secret data (SSDa) associated with the identified client [315]. Typically this just involves processing the generated random number using the stored authentication response algorithm (160) which should be shared with the client 105. The first device random number (RANDa), though not the processed random number (SSDa[RANDa]) is then forwarded as an authentication challenge to the client device [320]. Typically the authentication server will also generate a first device or client session key (K_A) at this point using the first device random number (RANDa) and the first device key generation algorithm 165 stored in the client's shared secret data (SSDa).

The authentication server then receives a response from the client which includes a first device processed random number or authentication challenge response (SSDa[RANDa]) [325]. Typically this number will be encrypted with the session key (K_A). The response from the client 105 is then checked against the processed random number (SSDa[RANDa]) generated by the authentication server [330]. If the two are not equal [330N], then this means the client device does not have the same authentication algorithms 165 and/or secret key 155 as associated with the first device or client shared secret data (or there has been a communications error), and so the authentication server can not confirm that the responding device is indeed the client device associated with that client shared secret data (SSDa). An authentication error message is then generated [335]. If the authentication response (SSDa[RANDa]) is equal to the first device processed random number generated by the authentication server [330Y], then authentication of the client to the authentication server has been successful, and the authentication server moves on to set up a secure communications channel with the wireless server identified (IDb) in the request message from the client.

The authentication server may additionally receive an authentication challenge from the client device which it responds to [340]. Typically this is achieved by the client device generating a further first device random number (RANDaas) which it forwards to the authentication server as an authentication challenge, typically using the first device session key (K_A). The client device and the authentication server generate a further first device processed random number (SSDa[RANDaas]) using the client secret shared data (SSDa)—for example the authentication response algorithm 165 together with the secret key (Ki-A) 155. The authentication server sends this processed random number to the client device as a response to the authentication challenge, and if the same as that generated by the client device, can be used to authenticate the authentication server (AS) to the client device (A).

The authentication server 115 then generates a second device random number (RANDb) together with a second device processed random number (SSDb[RANDb]) or challenge response using its second device shared secret data (SSDb) associated with the identified wireless server [345]. As before, typically this involves processing the generated random number using the stored authentication response algorithm (160) which should be shared with the wireless server 110. The second device random number (RANDb), though not the second device processed random number (SSDb[RANDb]) is then forwarded to the wireless server [350]. Typically the authentication server will also generate a second device session key (K_B) using the second device random number (RANDb) and the second device session key generation algorithm 165 stored in the wireless server's second device shared secret data (SSDb).

The authentication server then receives a response from the wireless server which includes a second device processed random number (SSDb[RANDb]) [355]. Typically this number will be encrypted with the second device session key (K_B). The response from the wireless server 110 is then checked against the second device processed random number (SSDb[RANDb]) generated by the authentication server [360]. If the two are not equal [360N], then this means the wireless server does not have the same authentication algorithms 165 and/or secret key 155 as associated with the wireless server shared secret data (or there has been a communications error), and so the authentication server can not confirm that the responding device is indeed the wireless server associated with that wireless server or second device shared secret data (SSDb). An authentication error message is then generated [365]. If the authentication response (SSDb[RANDb]) is equal to the processed number generated by the authentication server [360Y], then authentication of the wireless server by the authentication server has been successful, and the authentication server moves on to set up generate a common session key for the wireless server and the client.

As with the client device, the authentication server may additionally receive an authentication challenge from the wireless server which it responds to [370]. Typically this is achieved by the wireless server generating a further second device random number (RANDbas) which it forwards to the authentication server using the session key (K_B). The wireless server and the authentication server generate a further second device processed random number (SSDb[RANDbas]) or authentication challenge response using the wireless server secret shared data (SSDb)—for example the authentication response algorithm 165 together with the secret key 155. The authentication server sends this processed random number to the wireless server, and if the same as that generated by the wireless server, can be used to authenticate the authentication server to the wireless server.

The authentication server then sends a message to the wireless server, typically encrypted with the wireless server session key (K_B), that it has authenticated the client device [375]. Finally, the authentication server then generates a common session key (K_AB) which it encrypts and sends to the wireless server using the wireless server session key (KGB) and which it encrypts and sends to the client device using the client server session key (K_A) [380]. The common session key (K_AB) may be generated using the shared secret data of both the client and the wireless device, although other approaches are possible.

Figure 4:
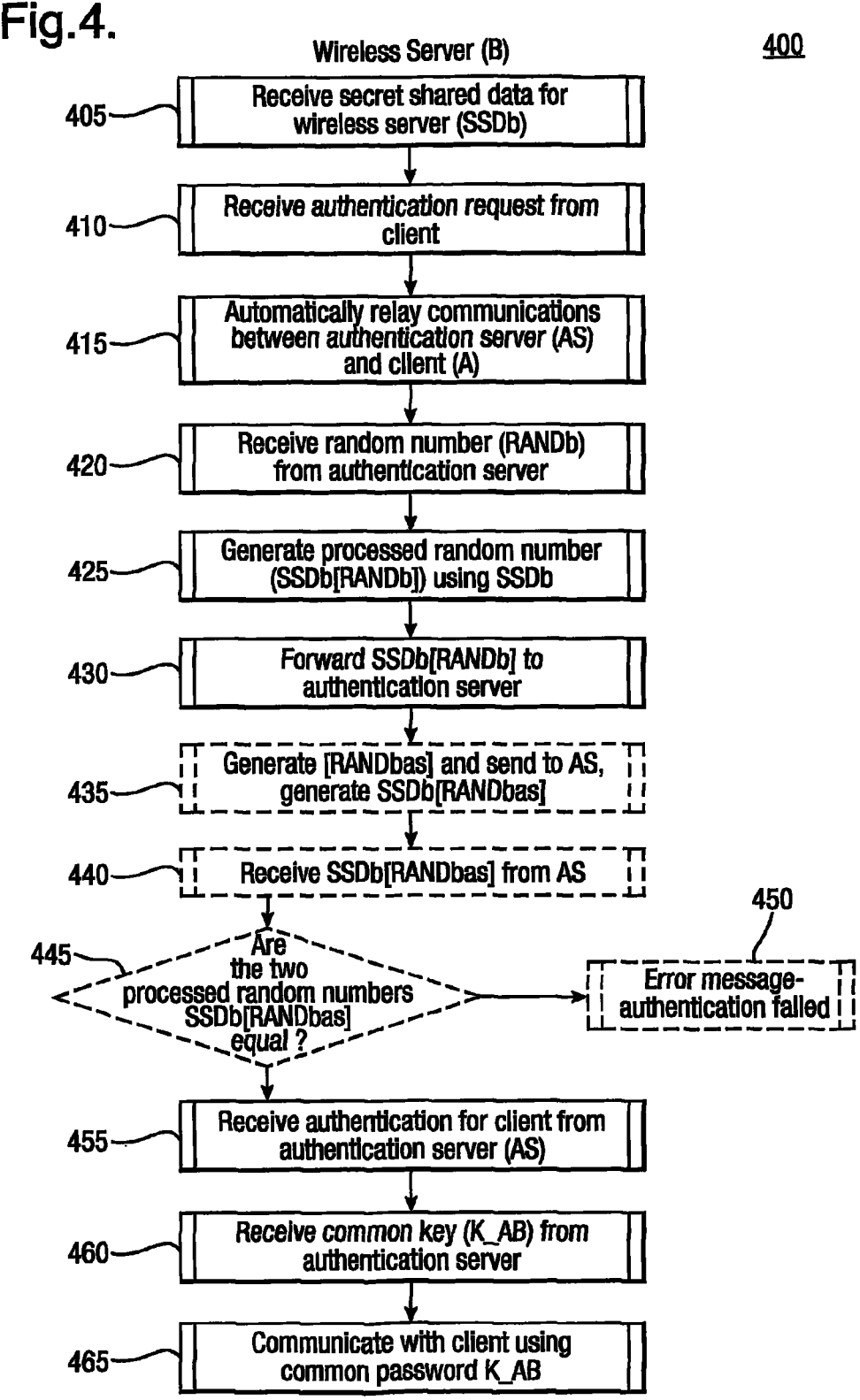
FIG. 4 illustrates a flow chart for a wireless server of the first embodiment.

FIG. 4 illustrates operation of the wireless server which receives the wireless or second device shared secret data (SSDb) typically with the insertion of a suitable SIM or other UICC card [405]. The wireless device 110 and the client device 105 may be associated or in non-secure wireless communication with each other. In this case the client device 105 may communicate with the authentication server 115 using this insecure wireless connection 130 and the wireless server's insecure connection 135 to the authentication server. However other methods are possible, for example the client device 105 may communicate with the authentication server 115 using a cellular network, especially if the authentication server is the same as the cellular operator. Thus the wireless server receives an authentication request from the client device [410], and is automatically configured to recognise such requests and to forward them to the authentication server. Typically the request will include a client identifier (IDa), and the wireless server (or client) may additionally add a wireless server identifier (IDb). Further authentication communications between the client device and the authentication server are recognised by the wireless server and relayed to the appropriate destination [415].

The client is usually identified through its MAC (Medium Access Control) address to the wireless server (and vice versa). Hence the wireless communication/connectivity will be based on this MAC address. Before the authentication is successful the addressing of each data packet exchanged between client and wireless server will solely be done at link layer. The wireless server will also associate this client's MAC address with the client identifier (IDa). The MAC address is specific to the device/mobile phone while the IDa is specific to the SIM card (or the user of the mobile phone). Based on the realm of the IDa (for example like the domain name in an e-mail address) the wireless server can recognise to which authentication server the authentication/access request should be forwarded. Another option is that the wireless server will forward any such client authentication request to the authentication server, to which the wireless server is registered. It is then the authentication server's decision how to proceed with such requests.

The wireless server receives a second device or wireless server random number (RANDb) from the authentication server [420] and processes this number (SSDb[RANDb]) using its second device shared secret data (SSDb) [425]. Typically a session key (K_B) will also be generated using this random number and a suitable session key generation algorithm in the shared secret data (SSDb). The processed number (SSDb[RANDb]) is forwarded to the authentication server [430]. Typically the wireless server also generates its own (further second device) random number (RANDbas), and a corresponding processed random number (SSDb [RANDbas]), and forwards the random number to the authentication server [435]. In response a processed random number (SSDb[RANDbas]) is received [440], and if equal to that generated by the wireless server [445Y], the authentication server is authenticated to the wireless server. If not [445N], an authentication error message is generated [450].

The wireless server then receives an authentication message from the authentication server, authenticating the client device [460]. Thus the wireless server can trust the client device, and allow it to connect through the wireless server to third parties, for example websites. The wireless server also receives a common session key (K_AB) from the authentication server [465], which can be used to communicate securely with the client device [470].

Figure 5:
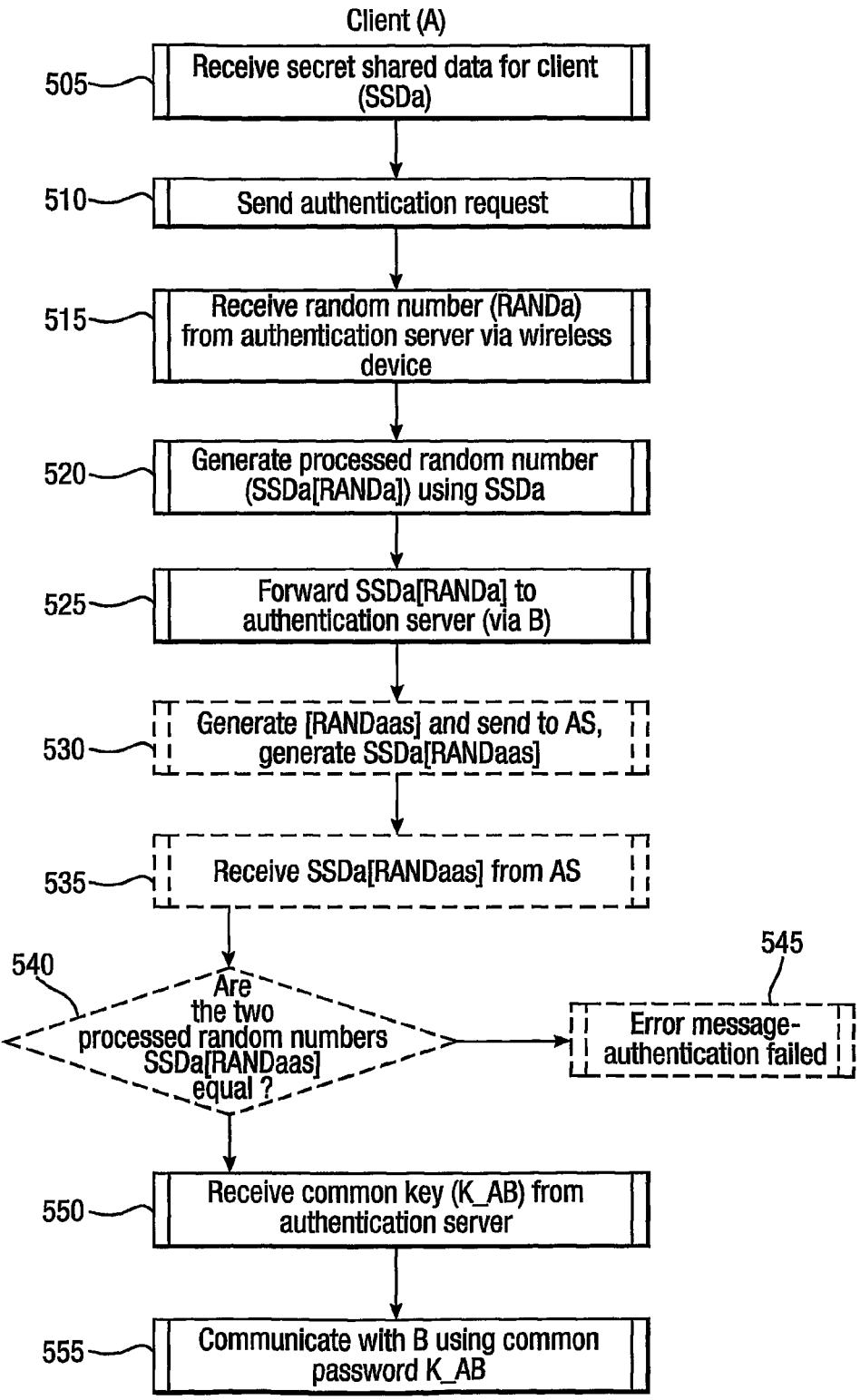
FIG. 5 illustrates a flow chart for a client device of the first embodiment.

FIG. 5 illustrates operation of a client device which receives client or first device secret shared data (SSDa) typically from an inserted SIM (A) card [505]. On associating with a wireless server and not being able to establish a secure connection using a common encryption password for example, the client can be configured to automatically send an authentication request to the authentication server [510]. This may be via the associated wireless server, a cellular connection, or any other suitable communications channel. In response, the client receives a random number (RANDa) from the authentication server which it uses to generate a session key (K_A) and an authentication response or first device processed random number (SSDa[RANDa]) [520] which it forwards to the authentication server [525] typically encrypted using the session key (K_A). In order to authenticate the authentication server, the client will typically generate another random number [RANDaas] which it sends to the authentication server [530]. If the response from the authentication server [535] equals the outcome (SSDa[RANDaas]) of the client's own processing of the same random number (RANDaas) with its secret shared data (SSDa), then the authentication is successful [540Y]. The client then receives a common key (K_AB) from the authentication server which is encrypted with the client session key (K_A). This key (K_AB) may then be used to communicate securely with the wireless server [555].

Figure 6:
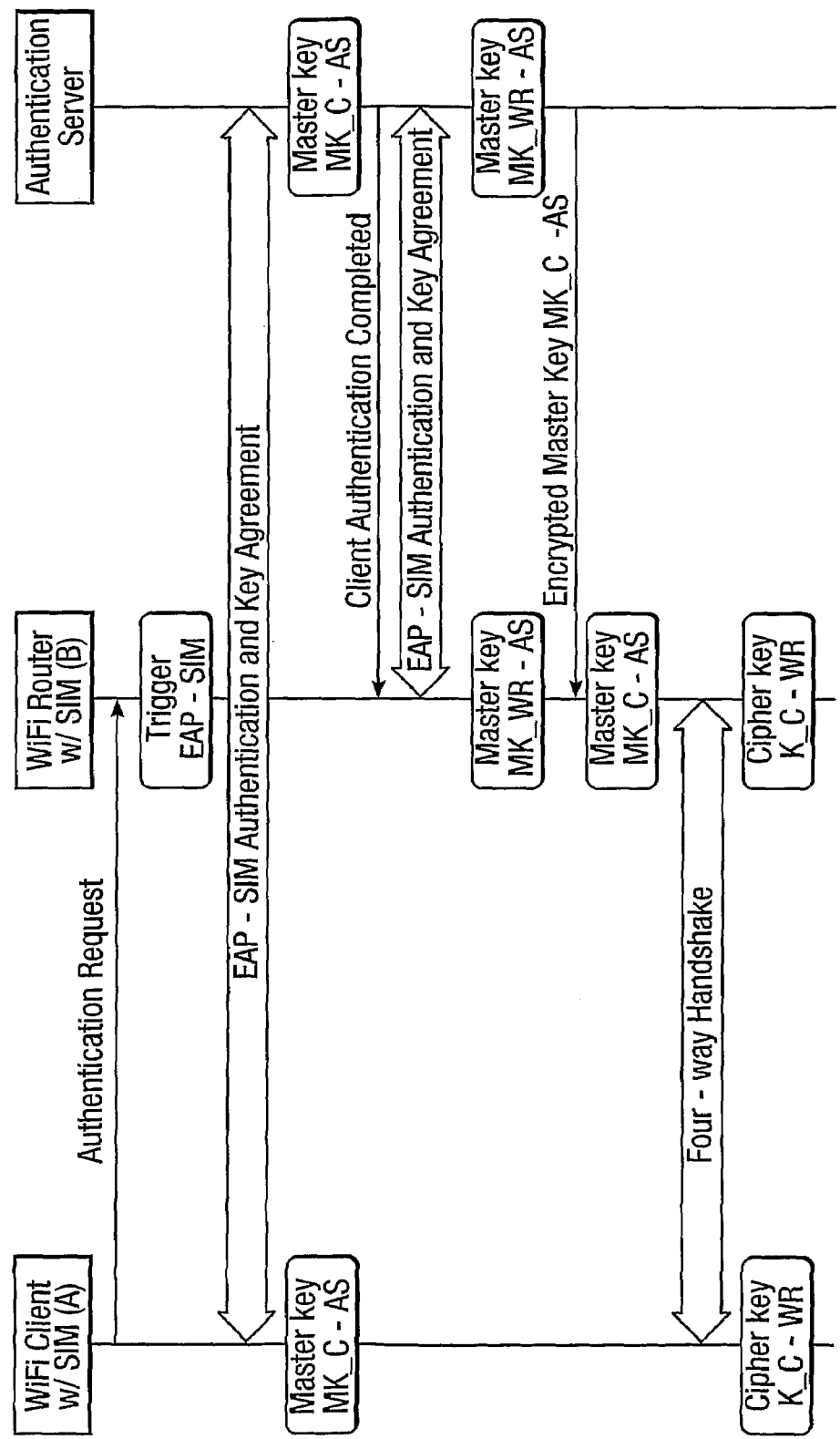
FIG. 6 illustrates a signalling diagram for a second embodiment of the present invention.

FIG. 6 shows a second embodiment in which the authentication and session key agreement between the authentication server and the client, and between the authentication server and the wireless server are both carried out using the EAP-SIM (extensible authentication protocol-subscriber identity module) protocol. The authentication request from the client triggers the EAP-SIM protocol to mutually authenticate the client and the authentication server, and to agree on or distribute a session key MK_C-AS (K_A in FIG. 2). Once this is completed, the same protocol (EAP-SIM) is used between the wireless server and the authentication server for mutual authentication and session key MK_WR-AS agreement (K_B in FIG. 2). A common key for example the client session key MK_C-AS (K_A in FIG. 2) can then be securely provided from the authentication server to the wireless server, who then communicates securely with the client using this. Alternatively a new common key (K_AB) may be generated and transferred securely to both the client and wireless server. The common key may be used as a session key, or to generate a session key(s) and enable security handshaking between the two devices 105 and 110.

Figure 7:
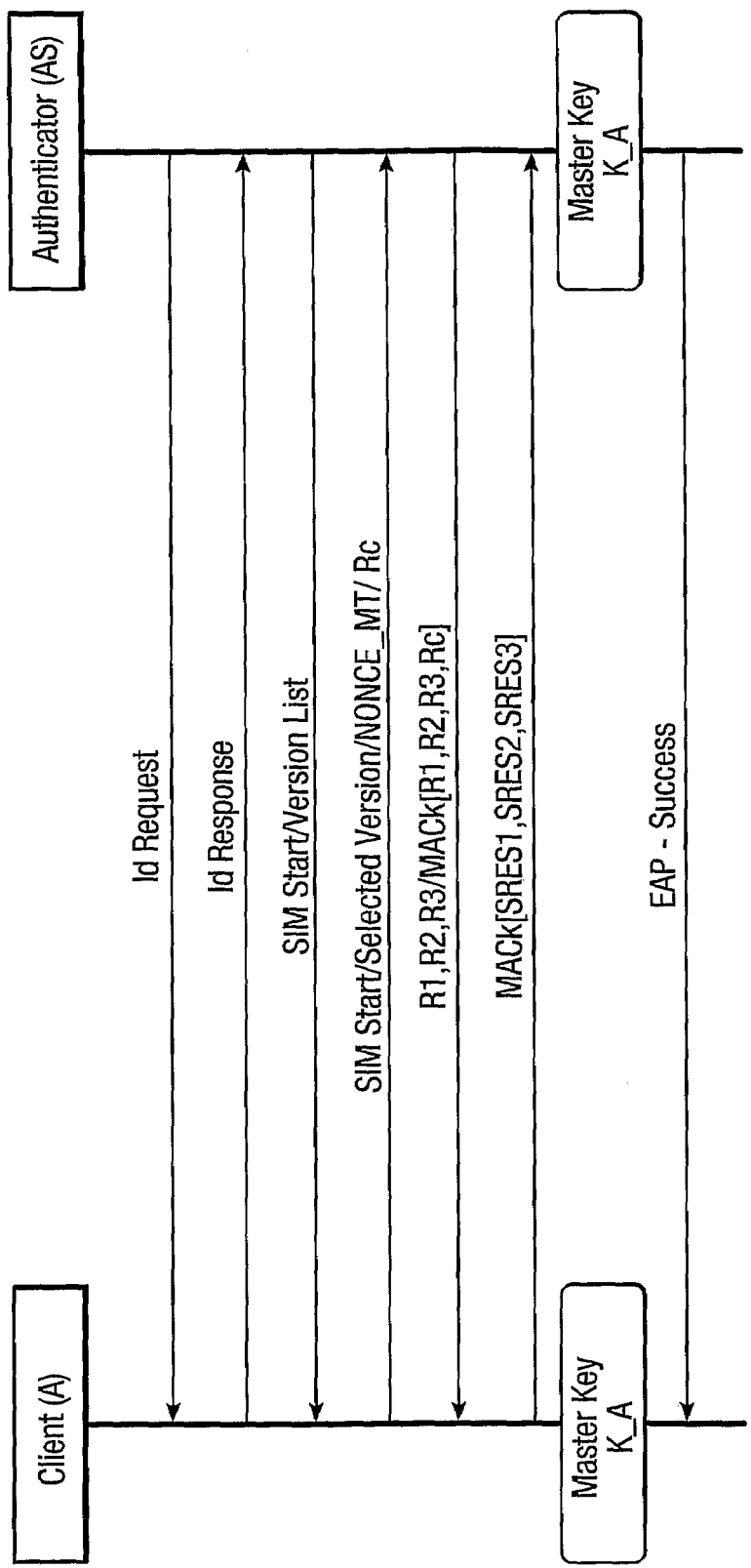
FIG. 7 illustrates a signalling diagram for the EAP-SIM authentication and key agreement protocol.

Although the EAP-SIM protocol will be well known to those skilled in the art, FIG. 7 illustrates the EAP-SIM protocol at a high level. The numbered steps which follow refer to each line in the drawing or signalling transfer between the authentication server (AS) and a (first or second) device (A or B); from top down.

1) The authenticator (in both cases the authentication server 115), requests the client (or later the wireless server) identity.
2) Client responds with Identity (International Mobile Subscriber Identity (IMSI) for full authentication).
3) Authenticator sends an EAP-SIM start request packet that contains the list of EAP-SIM versions supported by the EAP server in the AT_VERSION_LIST attribute.
4) Client replies with an EAP-SIM response packet which contains a random challenge (NONCE_MT/Rc) chosen by the Client, and the AT_SELECTED_VERSION attribute contains the version number selected by the Client.
5) Authenticator responds with a list of n (n=1 to 5) random challenges to authenticate the Client. These are produced by a GSM algorithm which generates a triplet of RAND, SRES and Kc. RAND is a 128 bit number used with a root key Ki (up to 128 bits stored on the SIM—the shared secret key) to generate a 64 bit key Kc and a 32 bit value SRES. Authenticator also sends a MAC of its n random numbers and Rc (the original random number sent by the Client). The MAC algorithm is HMAC-SHA1-128 [RFC2104] keyed hash value. The 16 byte HMAC-SHA1-128 value is obtained from the 20-byte HMAC-SHA1 value which is used to derive MK and is produced by concatenating a series of values—SHA1 (Identity|n*Kc|NONCE_MT|Version List|Selected Version). MK (Master Key—K_C or K_WS in FIG. 2) is fed into a PRNG (Pseudo Random Number Generator) to produce Transient EAP Keys (TEKs) for protecting EAP-SIM packets, MSK (Master Session Key) for link layer security and EMSK (Extended Master Session Key). EAP-SIM requires two TEKs for its own purposes, the authentication key K_aut to be used with the AT_MAC attribute, and the encryption key K_encr, to be used with the AT_ENCR_DATA attribute. The same K_aut and K_encr keys are used in full authentication and subsequent fast re-authentications.
6) Client verifies MAC by using Ki (shared secret) to generate Kc and then in turn uses this and the RANDs to generate MK and then the MAC key K_aut. It then compares the generated MAC with the received MAC. If MACs do not match, Client sends EAP-Response/SIM/Client-Error and the exchange terminates. If MACs match, Client then uses K_aut to MAC the SRESs and sends to Authenticator. The SRES_A and SRES_B variables are first and second device processed random numbers which are dependent on the respective shared secret data (SSDa or SSDb) on each SIM card (SIM A or SIM B) in using a secret key (Ki-A or Ki-B) and an algorithm (algorithm A3 in a GSM SIM) which processes the respective first and second device random numbers (AT_RAND_A or AT_RAND_B) received from the authentication server. This algorithm can also be used to produce an output, using the random number (AT_RAND_A or AT_RAND_B) and the secret key (Ki in a SIM), which is the concatenation of SRES and another secret key (Kc in SIM) used to provide session keys.
7) Authenticator verifies MAC and sends success packet.

Figure 8:
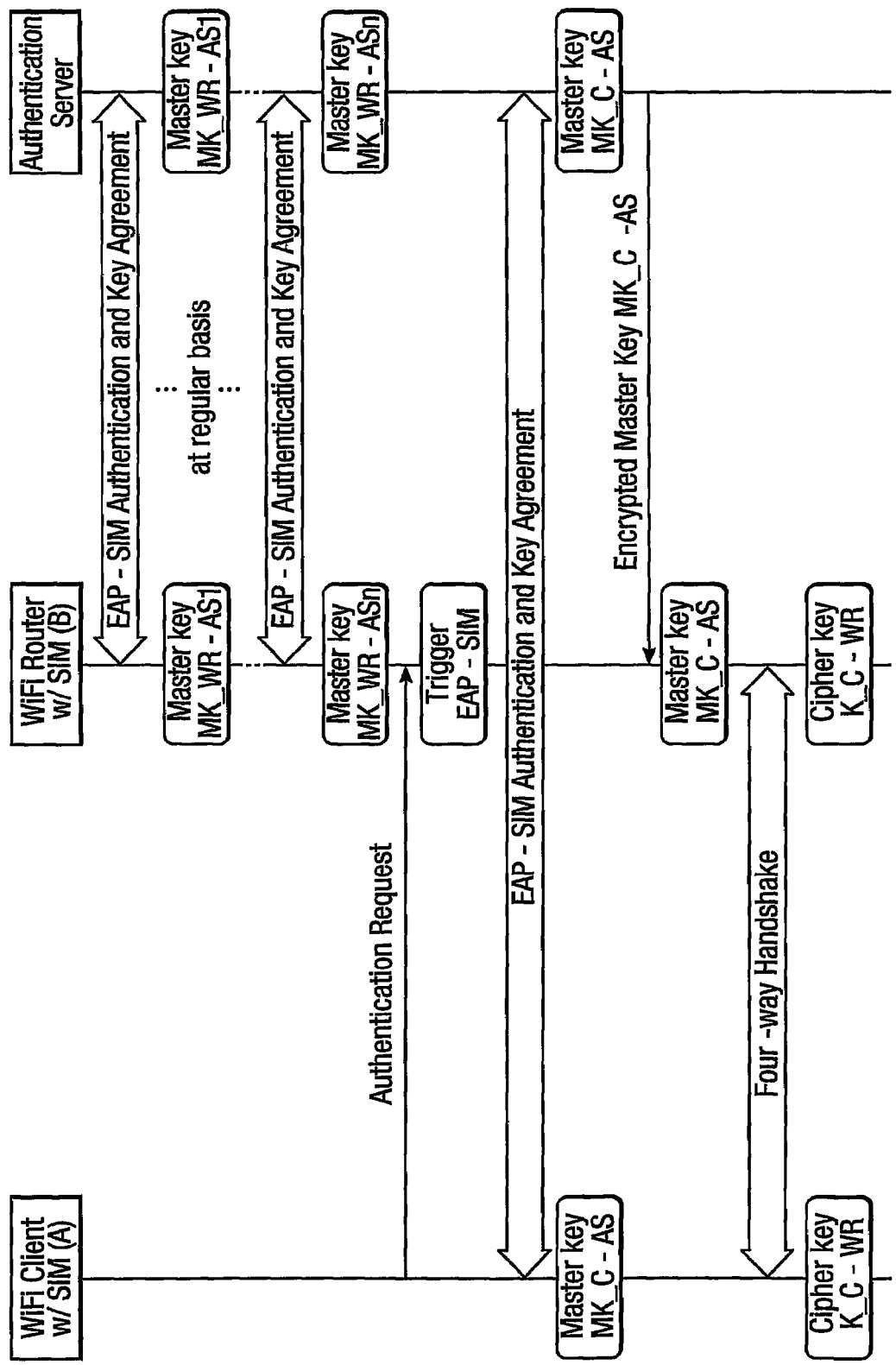
FIG. 8 illustrates a signalling diagram for a third embodiment of the present invention.

FIG. 8 illustrates a signalling diagram for an alternative embodiment in which the EAP-SIM procedure is carried out between the wireless server and the authentication server first, before the client requests a connection. This minimises any possible delay caused by the EAP-SIM procedure between the WiFi router and the authentication server, and hence a semi permanent secure communication channel will be established between the WiFi router 110 and the authentication server 115. The shared master key (MK_WR-AS)—the second device or wireless server session key K_B in FIG. 2—may be refreshed or updated on a regular basis (e.g. daily or hourly, depending on the operator's security policy), as long as the WiFi router is online. Apart from the first EAP-SIM procedure (initiated after the WiFi router is online) the authentication messages that are part of subsequent EAP-SIM procedures can be transferred in encrypted form (using a cipher key derived from the former master key MK_WR-AS). This way all the WiFi client authentication messages can be encrypted while being transferred between the WiFi router and the authentication server.

Figure 9:
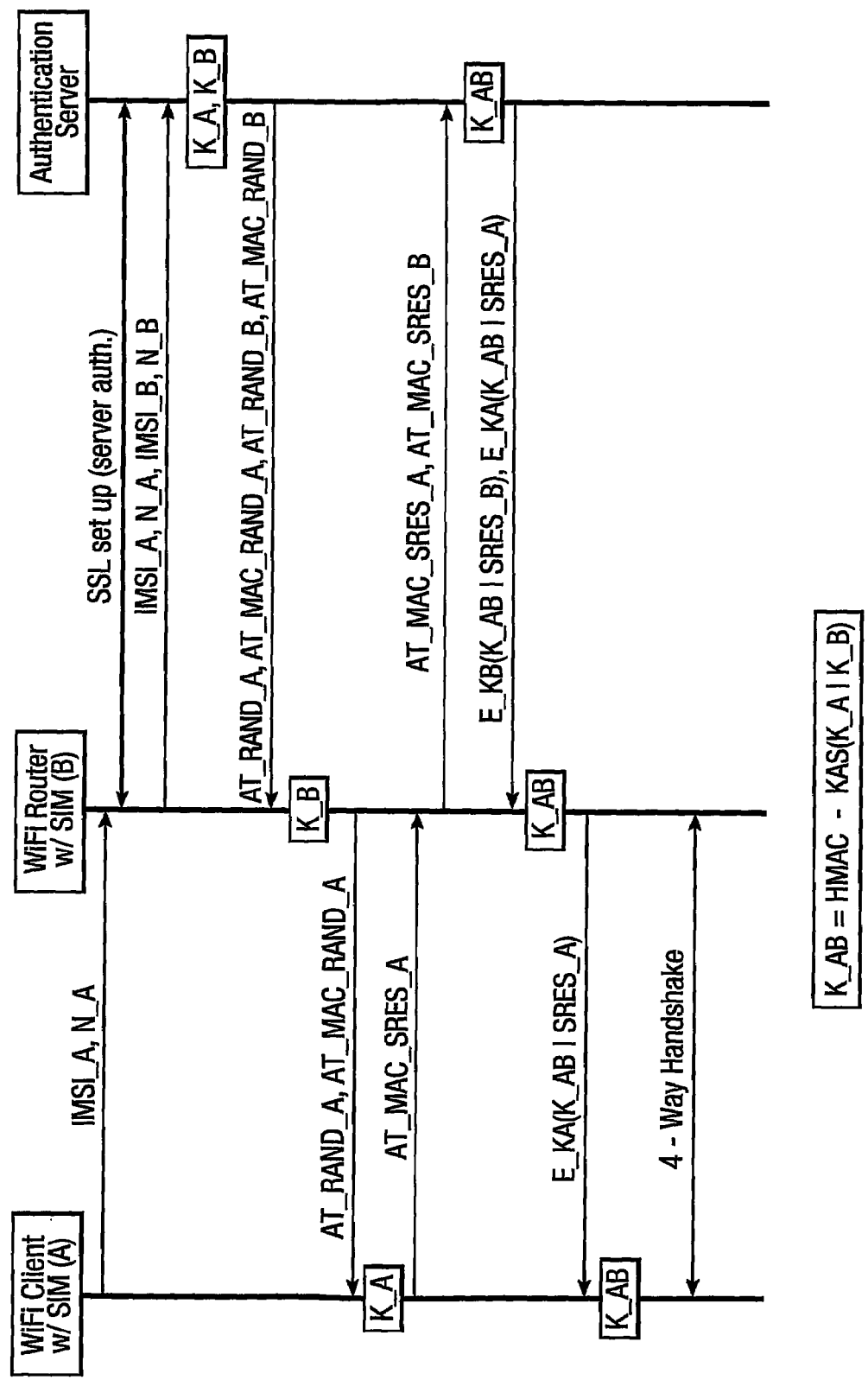
FIG. 9 illustrates a signalling diagram for a fourth embodiment of the present invention.

Another variation of the authentication and key agreement procedure is depicted in FIG. 9, and uses a protocol which reduces the overhead compared with the EAP-SIM protocol. Once the WiFi link layer connectivity (i.e. association) between the WiFi client 105 and WiFi router 110 has been established, the following steps are taken:

1) The WiFi client or first device 105 with SIM (A) 120 starts the EAP-SIM-like authentication procedure by sending the WiFi router 110 an authentication message which includes its identity (IMSI_A) and a random nonce value (N_A). These are the parameters specified by the standard EAP-SIM protocol, although provided in a different request/response message structure. It is further assumed that there is no existing (or pre-established) strong security and trust relationship between the WiFi router and the corresponding authentication server.
2) On receipt of the authentication message from the WiFi client 110, an SSL (Secure Socket Layer) encrypted link is set up between the WiFi router 110 and the authentication server 115. The SSL authentication only provides server authentication and no client authentication. Hence after such an SSL channel has been established, although the authentication server (AS) has already been authenticated against the WiFi router (B) (as is usually the case in HTTP over SSL (HTTPS) connections) the WiFi router has not yet been authenticated. From now on subsequent communications between the WiFi router and the authentication server will be encrypted. Alternative TLS (Transport Layer Security) protocols could be used.
3) The WiFi router 110 forwards IMSI_A and N_A together with its own identity IMSI_B and a random nonce value N_B, to the authentication server 115. The transmission of the second device identifier (IMSI-B) and nonce N_B is not specified in the standard EAP-SIM protocol. By sending its own identifier and nonce, the wireless router (B) asks the authentication server also to authenticate it in relation to the client 105 authentication.
4) The authentication server 115 runs a GSM algorithm and generates two sets of GSM triplets for SIM (A) 120 and SIM (B) 125. The GSM triplets may also be requested from a remote HLR (Home Location Register) connected to the authentication server. AT_RAND_A, AT_MAC_RAND_A, AT_RAND_B, AT_MAC_RAND_B are then sent to the WiFi Router 110 with SIM (B) 125. The generation of the contents of the first and second device random numbers AT_RAND_A (and AT_RAND_B) as well as AT_MAC_RAND_A (or AT_MAC_RAND_B) is specified by the standard EAP-SIM protocol, and depends on the client shared secret data SSDa (or the wireless server shared secret data SSDb) The nonce processed numbers AT_MAC_RAND_A (or AT_MAC_RAND_B) are generated using the respective random numbers AT_RAND_A (or AT_RAND_B) and the respective nonces N_A (or N_B). They are used to demonstrate to the client (or wireless server) that the authentication server has received their transmitted nonce N_A (or N_B) and can use it as one parameter to derive their respective session keys (K_A or K_B). By examining and validating the contents of AT_RAND_B and AT_MAC_RAND_B, the WiFi router using the wireless server shared secret data SSDb, i.e. SIM (B), can generate the wireless server key K_B. The same key K_B will also be generated by the authentication server. K_B is derived from the respective Kc values as specified by the standard EAP-SIM protocol.

5) The WiFi router forwards the parameters AT_RAND_A and AT_MAC_RAND_A to the WiFi client. The WiFi client with SIM (A) or SSDa examines and, validates these parameters, and generates the client key K_A according to the procedure specified in EAP-SIM. The same key K_A is also generated by the authentication server using the client shared secret data SSDa.

6) To complete the authentication, the WiFi client generates a first device processed random number AT_MAC_SRES_A from the client to the authentication server with the help of SIM (A) or SSDa and according to the procedure specified in the EAP-SIM protocol. The WiFi client sends AT_MAC_SRES_A to the WiFi router.

7) The WiFi router forwards this parameter together with its own generated second device processed random number AT_MAC_SRES_B value to the authentication server.

8) The authentication server verifies AT_MAC_SRES_A and AT_MAC_SRES_B. If the verification of both values is successful, this means that the WiFi client and the authentication server are now mutually authenticated, and also the WiFi router and the authentication server are mutually authenticated.

9) As no secret key has yet been shared between the WiFi client and the WiFi router, the authentication server generates another common key K_AB. K_AB can be generated either dependent or independent of any of the previously exchanged security parameters. In this embodiment the authentication server concatenates K_A with K_B and generates a keyed-hash MAC value over it using a secret key K_AS, which is only known to the authentication server. Hence K_AB=HMAC-KAS(K_A|K_B).

10) The authentication server concatenates K_AB with the second device concatenation number SRES_B, and encrypts the result with K_B, i.e. E_KB(K_AB|SRES_B). Similarly the authentication server concatenates K_AB with the first device concatenation number SRES_A, and encrypts the result with K_A, i.e. E_KA(K_AB|SRES_A). SRES_B and SRES_A represent the concatenation of the SRES values included in AT_MAC_SRES_B and AT_MAC_SRES_A respectively. The authentication server sends the values E_KB(K_AB|SRES_B) together with E_KA (K_AB|SRES_A) to the WiFi router.

In general the concatenation of K_A and K_B should provide a key material which is dependent on the keys previously exchanged between the Client (A) and AS, and between the wireless router (B) and AS. Thus K_A and K_B are used as materials since they were already generated in a secure way, rather than using a completely new key material (a random number) which requires another "secure way/mechanism" to generate it. The use of an authentication server secret key K_AS (which is only known to AS) increases the security of the eventually generated key K_AB. When using traditional GSM authentication algorithms K_A and K_B have a security level of 64 bit security. Their concatenation will be 128 bit. If K_AS is 128 bit, then the security level of K_AB will then be 128-bit security. Hence even if an attacker managed to compromise K_A and K_B but without knowing K_AS the attacker cannot generate K_AB.

The concatenating of SRES_B and SRES_A protects the message from replay attack since SRES values will be different for each authentication session (SRES_A and SRES_B values are only known to Client (A) and Wireless Server (B), respectively; the Authentication Server knows both). Hence, without concatenating with SRES values, an attacker (man-in-the-middle) may be able to resend an old (encrypted) K_AB (or any data) to B (without B knowing how to validate the "authenticity" and "up-to-dateness" of the key K_AB); because even if the "old encrypted K_AB" is encrypted with a wrong K_B (by the attacker), B will then decrypt it with the correct K_B and get a result as sequence of bytes which it might interpret as a K_AB. Another advantage of concatenation of K_AB and SRES_A is to prevent B from "guessing" K_A by means of known-plaintext attacks (because B knows K_AB).

11) The WiFi router decrypts E_KB(K_AB|SRES_B) and extracts K_AB. It then forwards E_KA(K_AB|SRES_A) to the WiFi client.

12) The WiFi client decrypts E_KA(K_AB|SRES_A) and extracts K_AB.

13) Both the WiFi client and WiFi router perform the four-way handshake protocol using K_AB as their pairwise master key value in accordance with the IEEE 802.11i standard. The outcome of the handshake protocol is a shared session key which can be used to secure the wireless communication between WiFi client 105 and router 110, thus allowing the client a secure route to the Internet, via an authenticated and therefore trusted, WiFi router.

All the exchanged messages (and parameters) between the involved entities can be encapsulated in the corresponding EAP-Framework messages in order to ease implementation. EAP framework specifies certain types of (container) messages like EAP-request, EAP-response, EAP-success, EAP-failure. Arbitrary protocol-related data/parameters can be included in such messages. Usually most of the messages coming from the AS will be contained in EAP-request messages, while from the Client/WS towards the AS in EAP-response messages. Keys can e.g. be contained in EAP-success messages. This enables compliance with the standard EAP framework.

This embodiment reduces the message exchanges/overheads and provides a tighter coupling between the authentication of A and B with AS. Thus A will not be authenticated by AS if AS cannot authenticate B at (more or less) the same time. This should ensure the up-to-dateness of all authentications (of A, B and AS) and may additionally minimise the possibility of replay attacks.

Figure 10:
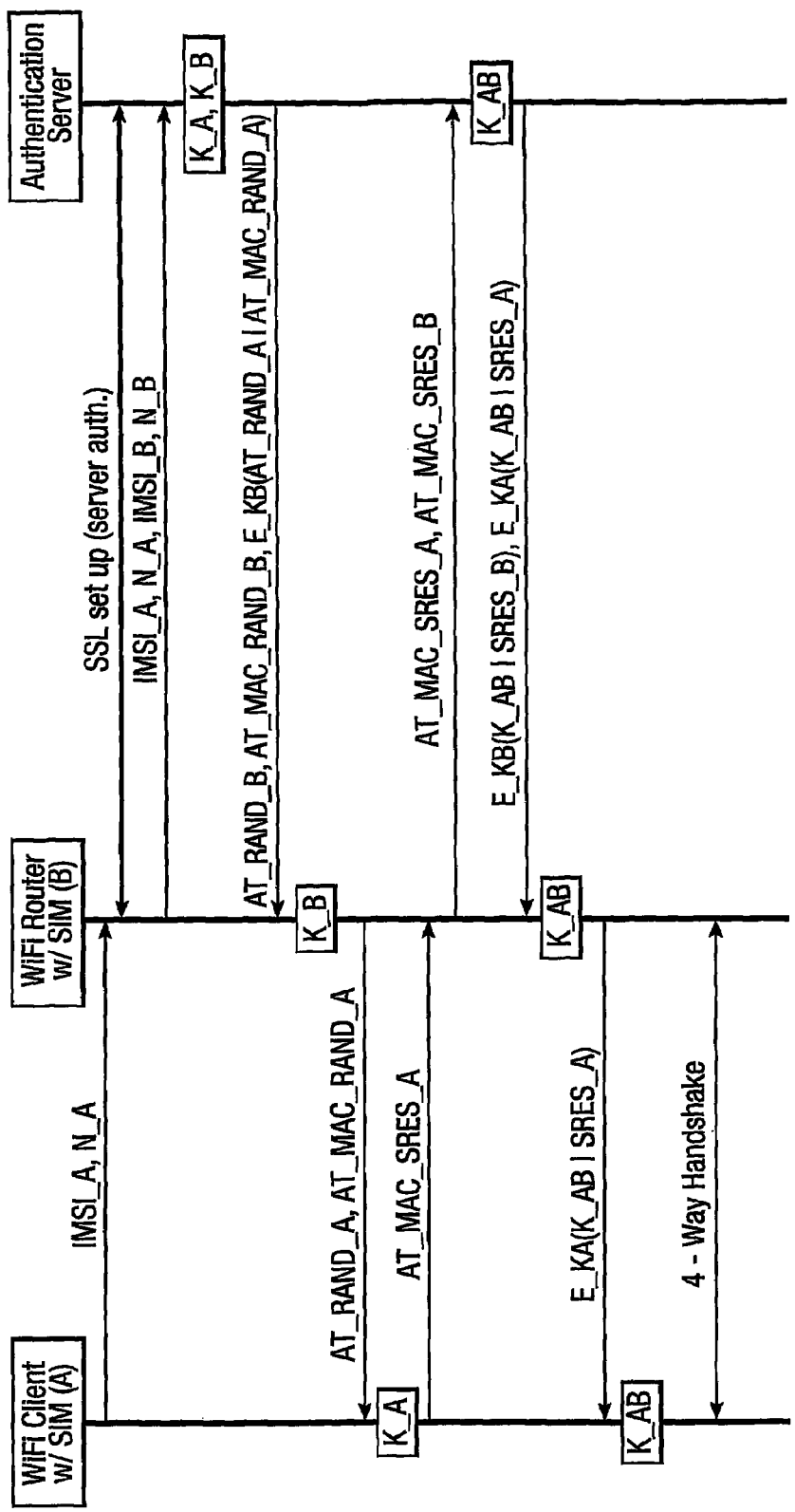
FIG. 10 illustrates a signalling diagram for a fifth embodiment of the present invention.

FIG. 10 illustrates a signalling diagram for another embodiment, the following different steps 4 and 5 compared with FIG. 9 are taken:

4) The authentication server runs a GSM algorithm and generates two sets of GSM triplets for SIM A 120 and SIM B 125. The GSM triplets may also be requested from a remote HLR (Home Location Register) connected to the authentication server. AT_RAND_A, AT_MAC_RAND_A, AT_RAND_B, AT_MAC_RAND_B are then generated according to the procedure specified in the standard EAP-SIM protocol. The first and second nonce processed numbers AT_MAC_RAND_A and AT_MAC_RAND_B are generated using the respective first and second device random numbers AT_RAND_A and AT_RAND_B, the respective first and second device secret shared data SSDa and SSDb, and the respective first and second device nonces N_A and N_B. The authentication server generates the key K_B and encrypts the concatenated value of the first random number AT_RAND_A and the first device nonce processed number AT_MAC_RAND_A with K_B, i.e. E_KB(AT_RAND_A|AT_MAC_RAND_A). As shown in FIG. 10 these parameters are then sent to the WiFi Router 110 with SIM (B) 125. By examining and validating the contents of AT_RAND_B and AT_MAC_RAND_B the WiFi router can generate the key K_B, as with FIG. 9. K_B is derived from the respective Kc values as specified by the standard EAP-SIM protocol.

5) The WiFi router decrypts E_KB (AT_RAND_A|AT_MAC_RAND_A) and forwards the outcome to the WiFi client 105. The WiFi client 105 with SIM (A) 120 examines and validates these parameters, and generates the key K_A according to the procedure specified in EAP-SIM. The same key K_A has also been generated by the authentication server as with FIG. 9.

With this additional encrypting of the random number challenge for the WiFi client with K_B, the WiFi router can only see the content of the authentication server's challenge messages for the WiFi client if it can correctly respond to the server's challenge directed to the WiFi router (i.e. AT_RAND_B). This improves the trustworthiness of the WiFi router towards the WiFi client.

Figure 11:
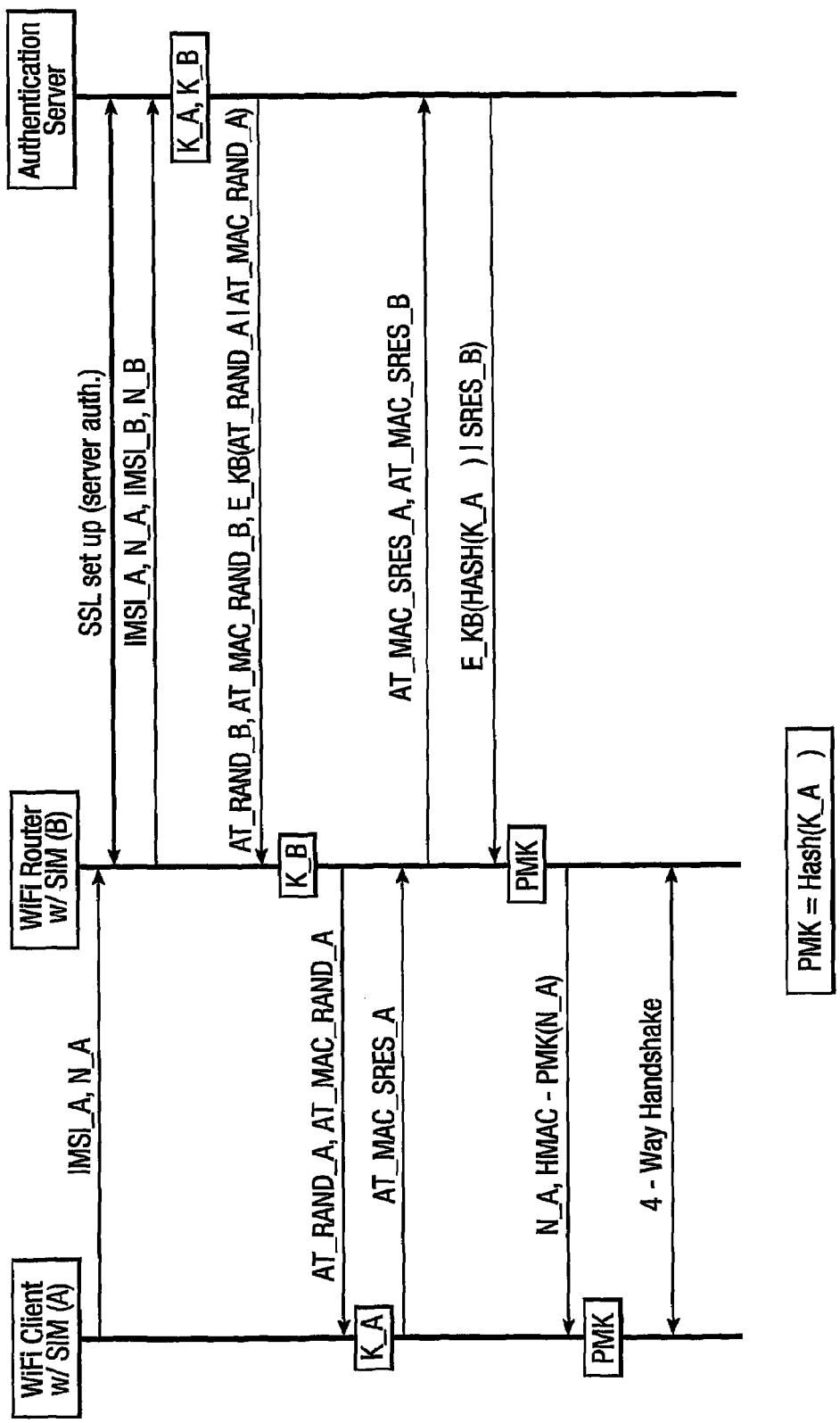
FIG. 11 illustrates a signalling diagram for a sixth embodiment of the present invention.

FIG. 11 illustrates a signalling diagram for another embodiment, which provides an alternative way to determine the shared secret or common key (i.e. PMK) between the WiFi client 105 and the WiFi router 110. PMK is equivalent to K_AB, the difference is that now K_AB (PMK) can also be generated by the WiFi Client, as it is actually derived from K_A. It comprises all the steps nos. 1 to 8 taken in the previously described procedures of FIGS. 9 and 10. The subsequent steps for completing the authentication and key agreement procedure are as follows:

9) Since a secret key has still not been shared between the WiFi client and WiFi router, the authentication server generates a hash value over K_A and concatenates it with SRES_B. SRES_B represents the SRES values included in AT_MAC_SRES_B (see Step 7). The concatenation result is then encrypted with K_B, i.e. E_KB(Hash(K_A)|SRES_B), and sent to the WiFi router.

10) The WiFi router decrypts E_KB(Hash(K_A)|SRES_B), extracts Hash(K_A) and verifies SRES_B. The WiFi router then uses Hash(K_A) as the pairwise master key (PMK) between it and the WiFi client. In order to prove that it owns PMK, the WiFi router generates a keyed-hash MAC value of N_A by using PMK=Hash(K_A) as the MAC key, i.e. HMAC-PMK(N_A). N_A was sent by the WiFi client to the WiFi router in Step 1. The WiFi router sends this validation parameter HMAC-PMK(N_A) which is dependent on the first device secret key (i.e. PMK) and N_A to the WiFi client.

11) The WiFi client generates PMK=Hash(K_A) and HMAC-PMK'(N_A). If the value HMAC-PMK'(N_A) matches the validation parameter HMAC-PMK(N_A) value received from the WiFi router, the WiFi client proceeds with the next step.

12) Both the WiFi client and WiFi router perform the four-way handshake protocol using PMK=Hash(K_A) as their pairwise master key value in accordance with the IEEE 802.11i standard. The outcome of the handshake protocol is a shared session key which can be used to enable secure wireless communication between the WiFi client and router, thus allowing the client a secure route to the Internet, via an authenticated and therefore trusted, WiFi router.

An advantage of using Hash(K_A) as the pairwise master key (PMK) in this procedure is that the WiFi client will have all the security materials necessary to derive PMK once it has completed the standard EAP-SIM authentication protocol (i.e. Step 6, after sending AT_MAC_SRES_A to WiFi router). This will eliminate the need for the authentication server to generate a new key to be shared between the WiFi client and the WiFi router. This arrangement provides an alternative way to generate the key between the Client and the Wireless Server; whilst reducing the overheads of AS for generating a new session key K_AB, which neither the Client nor the WS can calculate by themselves. It gives the Client more confidence that the session key (K_AB) received via WS has not been compromised. This is a similar approach to the EAP-SIM implementation where K_AB is only derived from K_A. But instead of sending K_A encrypted with K_B to the Wireless Server, the hash value of it (encrypted with K_B) is sent from the AS to the WS. Concatenation with SRES_B confirms the "up-to-dateness" of the key to WS.

Figure 12:
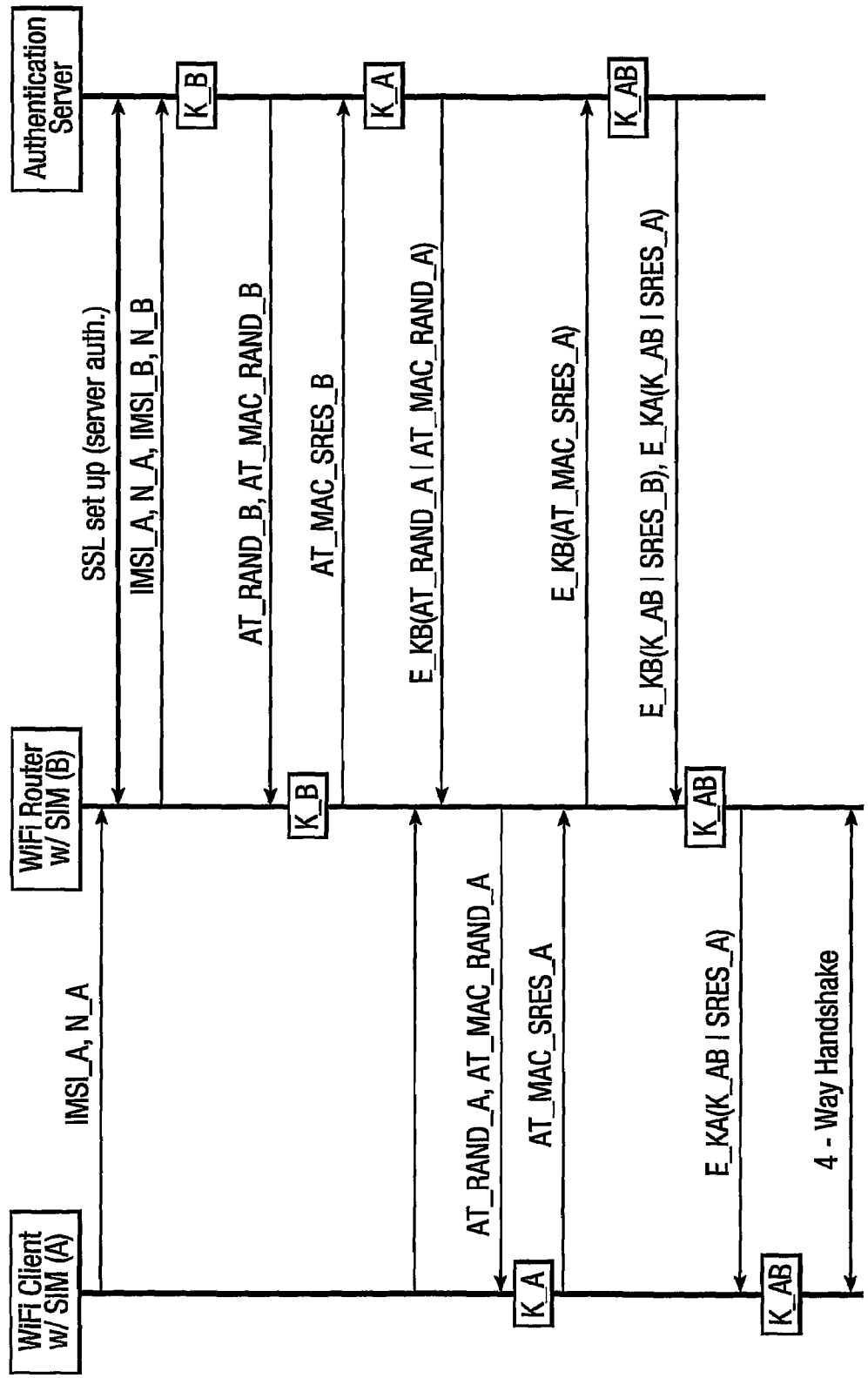
FIG. 12 illustrates a signalling diagram for a seventh embodiment of the present invention.

FIG. 12 illustrates another variation of the authentication and key generation procedure. The main difference from the previous procedures of FIG. 11 is that the EAP-SIM based authentication and key generation between the WiFi router 110 and authentication server 115 must first be successfully completed before the authentication server can send any authentication messages directed to the WiFi client (i.e. AT_RAND_A, AT_MAC_RAND_A) via the WiFi router. This variation represents a slight modification of the procedure depicted in FIG. 8.

The advantage of this arrangement is that the Authentication Server does not have to send a first device random number and server authentication message or nonce processed number (AT_RAND_A, AT_MAC_RAND_A), which are addressed to the Client 105, via the wireless server before the AS authenticates WS. This could be a security policy set by the Authentication Server's operator to avoid sending relatively sensitive authentication messages to a malevolent WS.

Figure 13:
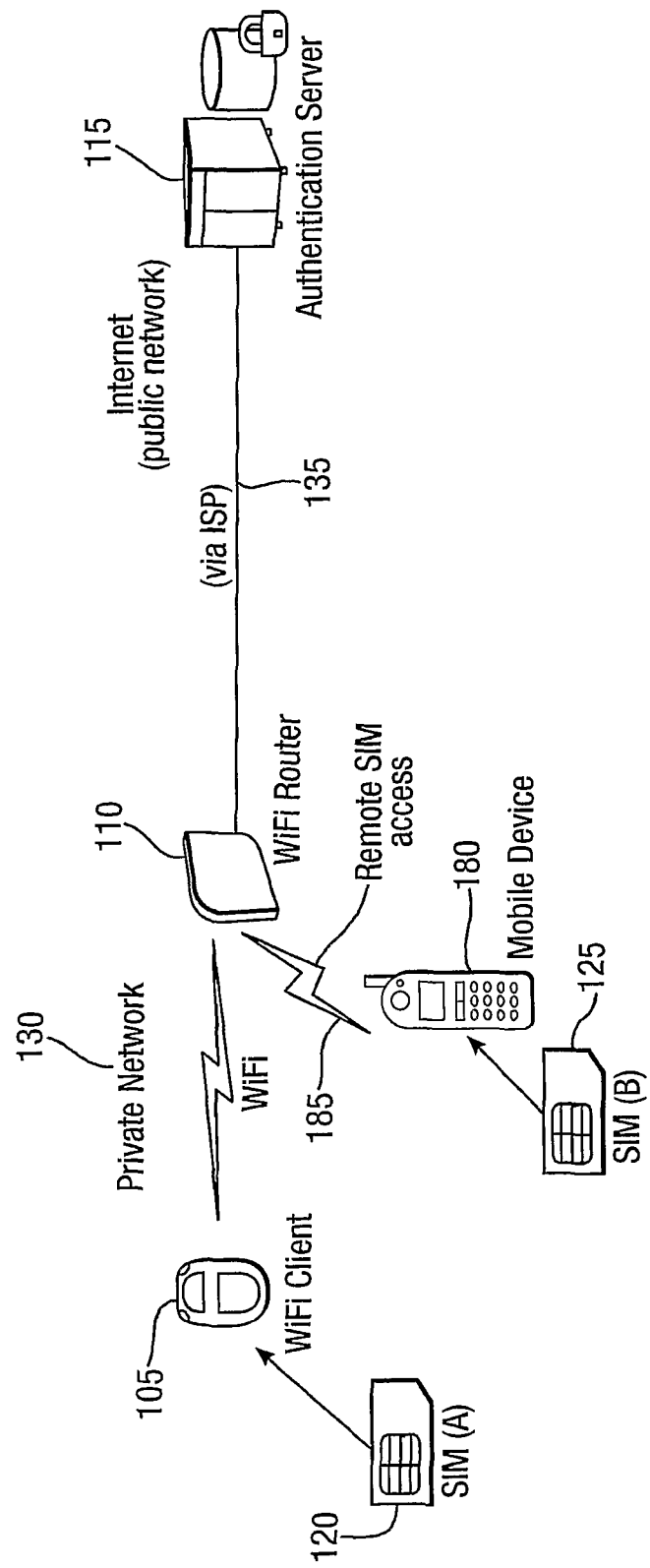
FIG. 13 is a schematic diagram illustrating another embodiment of the present invention.

FIG. 13 illustrates another embodiment in which the SIM card or other removable module having a secret shared key (155) and a secret shared algorithm (160) does not need to be physically integrated into the WiFi client (first) device or into the WiFi router/access point/server (second device). The SIM card might be present or inserted into another mobile or portable device, e.g. mobile phone, which can be wirelessly accessed by the WiFi client device or WiFi router as illustrated. Here entities which are the same as those of FIG. 1 have been referenced the same, and in addition a further mobile device 180 has been added which is coupled to the wireless server 110 using a secure wireless connection 185 such as Bluetooth for example. The SIM card 125 associated with the wireless server 110 is inserted into the second wireless mobile device 180 and any accessing of the wireless server shared secret data (SSDb) is done over the secure wireless connection 185.

This could be implemented for example in the case of a WiFi router without an integrated SIM card interface or slot, the WiFi router 110 can be wirelessly connected and paired via Bluetooth with the second mobile device 180 (with equipped SIM card) in proximity—for example using Bluetooth SIM access profile. A similar authentication and key generation procedure as previously described can be performed where the WiFi router 110 will now send particular commands and messages to the SIM card 125 inside the second mobile device 180 and get the corresponding responses. The remote SIM card has to be accessed for example when:

The WiFi router needs to verify the AT_MAC_RAND_B value (received from the authentication server).
The WiFi router needs to generate the AT_MAC_SRES_B value and the key KGB; the generated values can be stored in the WiFi router.

The communication between the WiFi router and the mobile device (bearing the SIM) should be secured properly. This wireless, remote SIM access also gives the user the possibility (i.e. the owner/operator of the WiFi router) of associating the WiFi router with more than one SIM card (inserted in mobile devices) at any time. The requirement of allowing EAP-SIM based third party authentication is that at least one of the mobile devices 180 with the associated SIM cards 125 should be present and in proximity (i.e. within communication distance) of the WiFi router. If more than one of the associated (second) mobile devices 180 with SIMs 125 are present, one of them should be selected based on either a pre-configured priority list or the best signal quality between the mobile device 180 and the WiFi router 110.

The authentication and key generation procedure can optionally be designed so that the WiFi router 110 explicitly asks the user (for example on his mobile device 180 which bears the SIM card) whether it should proceed with the EAP-SIM based authentication for particular WiFi clients 105. This will give the wireless server user more control over access authorisation within his home WiFi network.

Furthermore, it is also anticipated that remote SIM access (from the WiFi router) can be established with a second mobile device 180 (which bears the SIM card 125) using an existing WiFi connection. This particular WiFi link can be secured using the WiFi personal security mode by pre-sharing a secret key or password between the WiFi router and the particular mobile device 180.

Figure 14:
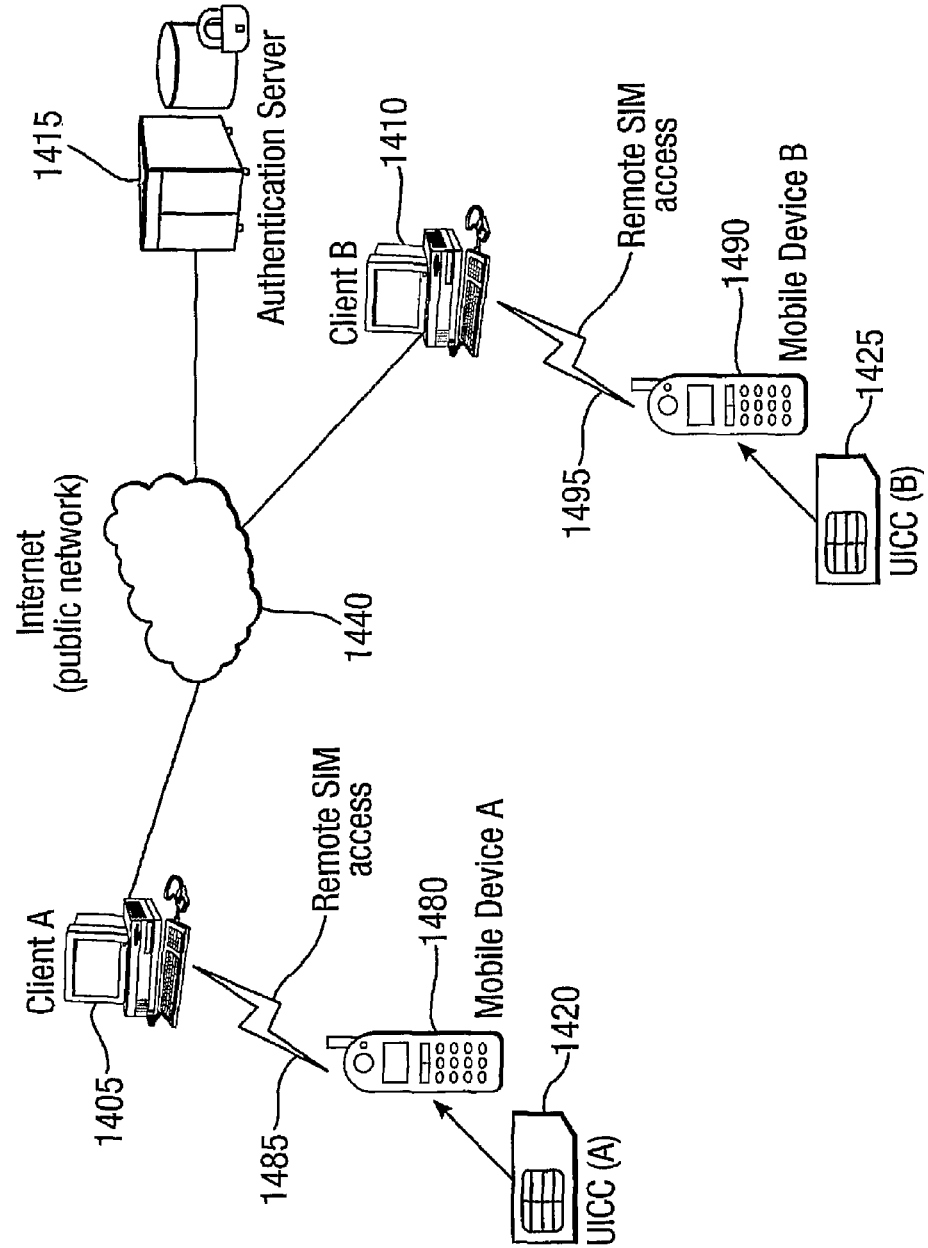
FIG. 14 is a schematic diagram illustrating yet another embodiment of the present invention.

Although the previous embodiments have been described with respect to a wireless client device and a wireless server, the first and second devices need not be wirelessly connected, nor one use the other for communicating with the authentication server. FIG. 14 illustrates an alternative embodiment in which two devices (A and B) are both coupled to the same network (Internet) to which the authentication server is also coupled. Both devices use a UICC card either inserted into the respective device itself, or into a respective proxy device such as a cellular phone which is in secure wireless (or other) connection with the first or second device. This arrangement allows users of a device to authenticate it to the authentication server and receive a common shared key for secure communication with another device. Thus for example a travelling salesman or executive could use his or her mobile phone to authenticate a publicly used internet terminal (for example in a library) in order to have a secure connection with another device connected to the internet.

Referring to FIG. 14, a system 1400 comprises an authentication server 1415 coupled to the internet 1440, which is also coupled to a first device (A) 1405 such as an internet terminal in a hotel room, and a second device (B) 1410 such as a laptop computer temporarily using an airport WLAN to connect to the internet 1440. Each device 1405, 1410 is associated with a proxy device 1480 and 1490 respectively using a secure wireless connection such as Bluetooth (1485 and 1495). The proxy devices are typically mobile phones each having an inserted UICC card such as a SIM card (A) 1420 and (B) 1425 respectively. In order for one of the devices 1405 or 1410 to securely connect to the other 1410 or 1405, a first device (A) requests authentication by the authentication server 1415 typically including an identifier for both itself and the second device (B). Then one of the methods described previously can be used for authenticating the first device (A) to the authentication server 1415 and for authenticating the authentication server 1415 to the second device (B), or indeed for mutual authentication, and for distributing a common shared secret key (K_AB) to the first and second devices for use in secure communications between them. For example the EAP-SIM protocol may be used between the authentication server and the first and second devices for mutual authentication and key agreement (K_A, K_B), before using these respective keys to forward the common key (K_AB) to the first and second devices.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A method of securely connecting a first device (A) to a second device (B) using a third party authentication server (AS) coupled to the second device, wherein:
   (i) the first device and the authentication server both have first device shared secret data (SSDa) shared by said authentication server and said first device but not shared with said second device;
   (ii) the first device shared secret data (SSDa) is stored on a user-insertable and user-removable hardware module inserted into said first device or a proxy device which is able to communicate with said first device;
   (iii) the second device and the authentication server both have second device shared secret data (SSDb) shared by said authentication server and said second device but not shared with said first device; and
   (iv) the second device shared secret data (SSDb) is stored on a user-insertable and user-removable hardware module inserted into said second device or a proxy device which is able to communicate with said second device;
   the method comprising:
   receiving a request from the first device at the authentication server;
   the authentication server and the first device both generating a first device key (K_A) using the first device shared secret data in response to a first device random number (RANDa) sent from the authentication server to the first device;
   the authentication server and the second device both generating a second device key (K_B) using the second device shared secret data in response to a second device random number (RANDb) sent from the authentication server to the second device; and
   the authentication server securely forwarding to the second device (B) and the first device (A) a common key (K_AB) using the second and first device keys (K_B, K_A).

2. A method according to claim 1, wherein the first device is a wireless client device and the second device is a wireless server wirelessly connected to the wireless client device.

3. A method according to claim 1, wherein forwarding of the first and/or second device keys (K_A, K_B) and mutual authentication is achieved using the EAP-SIM protocol between the authentication server and the first device or the authentication server and the second device.

4. A method according to claim 1, wherein the common key (K_AB) is encrypted using the first device key (K_A) and sent from the authentication server to the first device, and the common key (K_AB) is encrypted using the second device key (K_B) and sent from the authentication server to the second device.

5. A method according to claim 1, wherein the common key (K_AB) is derived from the first device key (K_A) and sent from the authentication server to the second device encrypted using the second device key (K_B), and wherein the common key (K_AB) is generated by the first device in response to receiving a validation parameter (HMAC-PMK(N_A) dependent on the first device key (K_A) from the second device.

6. A method according to claim 1, wherein the first and second devices send respective random nonce values (N_A, N_B) to the authentication server and which are used to generate the respective first and second device keys (KA, KB) and/or the first and second device processed random numbers (SSDa[RANDa], SSDb[RANDb]).

7. A method according to claim 1, wherein forwarding of the first and/or second device keys (K_A, K_B) and mutual authentication is achieved using the EAP-SIM protocol between the authentication server and the first device and the authentication server and the second device.

8. A method according to claim 2, wherein the second device and the authentication server establish a secure communications channel using a transport layer security protocol prior to forwarding of the request.

9. A method according to claim 4, wherein the common key (K_AB) is concatenated by the authentication server with a first or second device concatenation number (SRES_A or SRES_B) known by the respective first or second device, prior to encryption with the first or second device key.

10. A method according to claim 6, wherein the authentication server generates a first device nonce processed number (AT_MAC_RAND_A) dependent on the first device nonce (N_A), the first device shared secret data (SSDa), and the first device random number (RANDa), and wherein the first device random number (RANDa) is concatenated with the first device nonce processed number AT_MAC_RAND_A) and encrypted with the second device key (K_B) prior to forwarding to the second device which is arranged to decrypt the concatenated first device random number and first device nonce processed number prior to forwarding to the first device.

11. A method of operating an authentication server for securely connecting a first device (A) to a second device (B), wherein:
    the first device and the authentication server both have first device shared secret data (SSDa) shared by said authentication server and said first device but not shared with said second device;
    (ii) the first device shared secret data (SSDa) is stored on a user-insertable and user-removable hardware module inserted into said first device or a proxy device which is able to communicate with said first device;
    (iii) the second device and the authentication server both have second device shared secret data (SSDb) shared by said authentication server and said second device but not shared with said first device; and
    (iv) the second device shared secret data (SSDb) is stored on a user-insertable and user-removable hardware module inserted into said second device or a proxy device which is able to communicate with said second device;
    the method comprising:
    receiving a request from the first device;
    generating a first device random number (RANDa) and a first device key (K_A) using the first device random number (RANDa) and the first device shared secret data (SSDa), and forwarding the first device random number to the first device;
    generating a second device random number (RANDb) and a second device key (K_B) using the second device random number (RANDb) and the second device shared secret data (SSDb), and forwarding the second device random number (RANDb) to the second device; and
    the authentication server securely forwarding to the second device (B) and the first device (A) a common key (K_AB) using the second and first device keys (K_B, K_A).

12. A method according to claim 11, wherein communications with the first device are via a connection with the second device; and further comprising establishing a secure communications channel using a transport layer security protocol with the second device prior to forwarding of the request.

13. A method of operating a second device (B) for securely connecting a first device (A) to the second device (B) using a third party authentication server (AS) coupled to the second device, wherein:
    (i) the first device and the authentication server both have first device shared secret data (SSDa) shared by said authentication server and said first device but not shared with said second device;
    (ii) the first device shared secret data (SSDa) is stored on a user-insertable and user-removable hardware module inserted into said first device or a proxy device which is able to communicate with said first device;
    (iii) the second device and the authentication server both have second device shared secret data (SSDb) shared by said authentication server and said second device but not shared with said first device; and
    (iv) the second device shared secret data (SSDb) is stored on a user-insertable and user-removable hardware module inserted into said second device or a proxy device which is able to communicate with said second device;
    the method comprising:
    generating a second device key (K_B) using the second device shared secret data in response to receiving a second device random number (RANDb) from the authentication server, wherein the second device shared secret data (SSDb) is stored on a removable module associated with the second device;
    receiving a common key (K_AB) from the authentication server encrypted using the second device key (K_B or K_WS); and
    communicating with the first device using the common shared key (K_AB).

14. A method according to claim 13, further comprising authenticating the first device in response to receiving the common key (K_AB).

15. A method according to claim 13, further comprising receiving a request from the first device and forwarding the request to the authentication server, and relaying subsequent communications between the authentication server and the first device.

16. A method of operating a first device (A) for securely connecting to a second device (B) using a third party authentication server (AS) coupled to the second device, wherein:
  (i) the first device and the authentication server both have first device shared secret data (SSDa) shared by said authentication server and said first device but not shared with said second device;
  (ii) the first device shared secret data (SSDa) is stored on a user-insertable and user-removable hardware module inserted into said first device or a proxy device which is able to communicate with said first device;
  (iii) the second device and the authentication server both have second device shared secret data (SSDb) shared by said authentication server and said second device but not shared with said first device; and
  (iv) the second device shared secret data (SSDb) is stored on a user-insertable and user-removable hardware module inserted into said second device or a proxy device which is able to communicate with said second device;

the method comprising:

sending a request to the authentication server;

generating a first device key (K_A) using the first device shared secret data in response to a first device random number (RANDa) received from the authentication server;

authenticating the second device in response to receiving a common shared secret key (K_AB) from the authentication server encrypted using the first device shared secret key (K_A); and communicating with the second device using a secure connection between the first device and the second device which uses the common key (K_AB).

17. A method according to claim 16, wherein the request is sent via the second device to the authentication server prior to authentication of the second device.

* * * * *